METHODS OF IMPROVING THE STABILITY
OF INTERCONNECTED POWER SYSTEMS
Original Filed Feb. 7, 1966

INVENTOR.
ROBERT H. PARK
BY Kenway, Jenney & Hildreth
ATTORNEYS

United States Patent Office

Re. 27,842
Reissued Dec. 18, 1973

27,842

METHODS OF IMPROVING THE STABILITY OF INTERCONNECTED POWER SYSTEMS

Robert H. Park, Brewster, Mass., assignor to Fast Load Control, Inc., Brewster, Mass.

Original No. 3,515,893, dated June 2, 1970, Ser. No. 525,615, Feb. 7, 1966. Application for reissue June 2, 1972, Ser. No. 259,337

Int. Cl. H02j *3/38*

U.S. Cl. 307—52 23 Claims

Matter enclosed in heavy brackets [ ] appears in the original patent but forms no part of this reissue specification; matter printed in italics indicates the additions made by reissue.

ABSTRACT OF THE DISCLOSURE

Control systems *and methods of control* for changing *the amount of power generated and the magnitude of connected load and for influencing* the distribution of power flow within [an interconnected] a power system *or an interconnection of systems* through the execution of changes in the driving power of prime movers, and changes in connected electrical loads, wherein initiation of control action is responsive to suddenly occurring events adapted to cause, or which could cause, system instability, and the power flow changes take place in such a way and with sufficient speed as to prevent or oppose development of instability.

*CROSS-REFERENCE TO RELATED INVENTIONS*

My invention relates to means for rapidly controlling power flow within power transmission elements of large interconnected power systems with a view to favorably affecting the stability of such systems.

More particularly, my invention relates to means, as above, which represent an advance over the prior art including my issued U.S. Pats. Nos. 3,051,842 and 3,234,-397 the second of which has been reissued as Pat. No. Re. 26,571, having to do with employment of line fault initiated combined use of fast momentary and sustained prime mover driving power reduction and momentary application of braking loads in power exporting areas of systems, *and also line fault initiated fast boosting* [or] *of* driving power and shedding of load in power receiving areas of systems, as a means of stability improvement and this patent is a continuation-in-part of those patents.

*BACKGROUND OF THE INVENTION*

(1) *Field of invention*

*The area of the utility of the invention comprises prevention of development of system stability within power systems or interconnections of systems when continuance of stable operation is threatened by line faults, and other events which cause sudden either momentary or sustained interruption or change of power flow over one or more circuits of the systems power transmission network.*

*The area of method comprises employment of means of effecting changes in the driving power of generator prime movers, and in the amount of connected load, with provision to accomplish within a period of time short enough to influence first-swing stability, which, in practice, means within a period of 0.4 to at most 2 seconds.*

*Thus the field of invention comprises employment of rapid changes in prime mover driving power and connected load, as a way to combat loss of synchronism of power system generators such as tends to take place in the case of certain types of suddenly occurring events.*

*Among system stability endangering events, the most commonly occurring is a line fault taking the form of a*

*short circuit to ground of one or more line phases while the most serious fault is a three phase short circuit occurring near to a generator or switching station high voltage bus, since, until clear, a three phase fault of this type entirely interrupts power transfer over all lines that unite at the bus. A two phase to ground fault tends to have much the same though not quite as severe an effect.*

*In power transmission systems a short circuit fault on a line normally operates circuit breakers at each end of the line thereby to isolate the fault, while further after a preset period, chosen long enough normally to extinguish an arc, the breakers may be reclosed automatically.*

*In some cases circuit breaker reclosure is first effected from one end of a transmission circuit, as preferably from the end remote from the fault, and later from the other end, except that this second reclosure is only effected if the fault does not redevelop.*

*In some cases it is elected to reclose breakers in response to a manually, rather than automatically, initiated reclose signal.*

*During the period prior to the opening of the breakers there is a relative acceleration between those synchronous machines within the system which are adjacent to the end of the line that was supplying power prior to the fault and those adjacent to the other end of the line, the relative acceleration being such as to increase relative angular displacement.*

*The effect of such acceleration at one end, and of deceleration at the other end, of a faulted line is to produce a difference in the velocities and an increase in the relative generator rotor displacement angle between the group of machines adjacent one end of the line, and the group of machines adjacent the other end of the line, with a resultant tendency to loss of synchronism and instability which when occurring causes voltage disturbances which operate to affect adversely the performance of connected equipment throughout the system, and in some cases leads to cascading type shut down of generators and widespread interruption of power supply to ultimate users, and it is a main aspect of the field of invention with which the present application is concerned to reduce to a minimum such differences in velocities and increases in phase angle.*

*According to known techniques, design of power transmission systems has been based mainly on the practices of utilizing two or more transmission circuits as a way to unite one or more generators, located within generating stations with generators and lines located in the balance of the system. Usually high voltage busses are provided as a way to electrically interconnect the generators located at any one station, and also usually transmission circuits that terminate at a station also connect to one or more busses. Further in the case of long parallel lines, one or more sectionalizing busses may be provided at intermediate points between line ends.*

*High speed circuit breakers, and relaying means adapted to rapidly cause them to open are provided at either end of individual transmission circuits and are arranged to open when the circuit they control has become faulted thereby to isolate the fault, while also it is often the practice to reclose the same breakers after a short interval during which the arc at the point of fault may be expected to have become extinguished.*

*With the development of improved methods of cooling generators, and improved designs of the last stages of steam turbines, together with use of high steam pressures and temperatures, it has become possible to progressively get more and more capacity out of a turbine-generator without need for a proportional increase in inertia of rotating parts.*

*Also in some cases hydroelectric stations have been located at such great distances from loads that the severity*

*of the problem of providing to preserve system stability despite line faults has increased considerably.*

*At the same time the present day importance of avoiding even occasional disruptions of user power supply has led to general acceptance of a need to design power systems so that loss of system stability does not occur even in the event of delay in clearance of a line fault.*

*These several factors acting together have resulted in the building of more lines, and of lines of higher voltage than would otherwise be needed (42, 43)*[1]*, but the expense that this has entailed, plus the present day requirement of taking care to avoid unneeded line construction in order to minimize adverse effects on the environment, has stimulated power industry examination of alternate ways of solving the system stability problem, and have, in particular, led to a consideration of the benefits of line fault initiated fast steam turbine driving power reduction and momentary application of braking loads (30, 40, 41, 42, 43, 44) as ways to preserve system stability, and it has also become general practice to provide under-frequency initiated load shedding as a way to contend with system separations occurring due to loss of stability or for any other reason.*

*The field of invention involved in employment of these procedures for the purposes cited can also be viewed as an aspect of a broader field of invention which I have termed "fast load control" (41), with a view to distinguishing truly fast acting controls from the almost universally employed but slow acting feed-back type methods for control of power system generated and transmitted loads (45).*

(2) *Prior art*

In relation to prior art concepts, it was already old in the art, prior to the filing of my issued patents, to employ generator trip off, tie line opening, momentary application of braking loads, and, fast momentary reduction of prime mover driving power, as measures for improving system stability in the event of a transmission line fault, and also to control such means in relation to both load fault severity and to conditions obtaining prior to the fault (2, 3, 4, 5, 6, 12) [.[1]], *where, as understood in the prior art (2, 4, 6), the word fast means fast enough to influence generator first forward swing in synchronous space following fault occurrence.*

*Early patents that are of interest as examples of prior art comprise U.S. Pat. Nos. 1,705,688, 1,935,292, and 1,834,807 which issued respectively to S. A. Staege on Mar. 19, 1929, S. B. Griscom et al. on Nov. 14, 1933, and W. F. Skeats on Feb. 1, 1931.*

*The disclosure contained in the Staege patent covers a process of momentarily closing a valve that controls the supply of water to a Pelton wheel type prime mover of a hydroelectric installation, in response to the occurrence of a line fault as evidenced by abnormally high generator current, with provision to do so rapidly enough to prevent the pulling out of step of the station's generators from generators located in the balance of a power system's generating stations.*

*In the area of prime mover driving power control the disclosure of the Griscom et al. patent adds the feature of providing a fast acting by-pass valve so arranged that when the valve of the Staege patent closes rapidly the by-pass valve opens by an amount sufficient to prevent development of undue hydraulic head in the pentstock that supplies water to the Pelton wheel.*

*In addition the Griscom et al. patent discloses the concepts of*

*(a) momentarily applying a resistive load at the generator terminals in response to a quick acting line fault responsive control system.*

[[1] Numbers in parentheses refer to appended table of references.]

*(b) responding rapidly to other aspects of a line fault than current magnitude, such as suddenly occurring reduction in either generator power output or voltage, and the development of a negative phase sequence component of line voltage.*

*(c) providing a sluggish power flow responsive device which operates to render inoperative the quick acting fault responsive controls as in (b) above, or in Staege, except when the power exceeds a predetermined amount which implies inoperativeness if prefault power falls below a preset value.*

*The Skeats patent added the features of utilizing a polyphase torque motor as a fast acting fault responsive device, and of varying the magnitude of the resistance load in response to prefault load.*

*In U.S. Pat. No. 2,285,203 which issued in June 2, 1942, to F. A. Hamilton, Jr. disclosed the idea of providing to maintain synchronous operation of a pair of power systems that were interconnected by a single tie circuit, despite a fault on that circuit, by first clearing the fault, then rapidly reclosing the line circuit breakers while at the same time applying a braking load for a period terminating at about the instant of breaker reclosure.*

*In the area of reduction to practice, the capability of momentary closure of both control and intercepting valves to improve system stability was successfully demonstrated in tests carried out in 1929–30 on a 50,000 kw. reheat type steam turbine, with dumping of valve actuator oil employed as a means of achieving sufficiently rapid valve closure (2), but although European preliminary studies (6, 38, 39), represent an aspect of the prior art, U.S. interest in fast prime mover driving power reduction as a means of improving system stability failed to revive until after presentation of a 1966 American Power Conference paper (41), following which a number of U.S. public utilities initiated programs of providing for employment of fast momentary intercepting valve closing in response to a sudden reduction in generator load such as takes place when a line fault occurs, while, in one case, provision was made to allow simultaneous employment of fast closure of control and intercepting valves (46).*

*Whereas, as noted in reference 41, over the years there have been numerous studies bearing on the utility of braking resistors, and, also, it has been reported that there has been working use in the U.S.S.R., the best known example of operative employment is in British Columbia (30).*

*As noted in my discussion of reference 42, braking resistors while, in principle, capable of functioning effectively as a system stability improving device, cost much more than does provision for momentary fast valving, and for this reason, for the present at least, their field of utility appears to be of limited to hydro-electric installations.*

[My first issued] *In 1956 I filed a patent application which dealt exclusively with the use of braking resistors. Subsequently after enlargement of scope to include fast prime mover driving power control* U.S. Pat. No. 3,051,-842 *was granted. This patent* dealt in part with line fault responsive procedures for electrically isolating a generator, generating station, or a generating segment or area of power system, from the balance of the system applying braking and fast prime mover driving power reduction during the period of isolation, as a way to reduce generator acceleration and thereafter reconnecting, to the balance of the system.

In another aspect, my first issued patent dealt with the use of fast prime mover driving power reduction and braking applied in a generating segment or area of a system on the occurrence of a fault on a line comprising only one path of two or more electrically parallel paths of power flow leading from the generating area to a power receiving area of a power system and with no generators or elements of the system other than the faulted line itself isolated.

An aspect of my first issued patent was that fast prime mover driving power reduction was optionally executed, not merely momentarily, as in the prior art, but also on a sustained basis.

Another aspect of that patent was that when isolation was employed, fast driving power reduction and momentary application of braking load were optionally used in combination, whereas, when isolation was not used, these measures were proposed for use only as alternative procedures.

A further aspect of that patent was the concept of modulation of line fault initiated prime mover driving power reduction responsive to transmitted load, through employment of a control system which altered its control characteristic in response to transmitted load up to the instant of fault, but that was uninfluenced by what happened during or after the fault.

My second U.S. Pat. No. 3,234,397, introduced the concept of employing line fault initiated momentary plus optionally sustained type prime mover driving power reduction apply in combination with dynamic braking within a generating segment or power exporting area of a power system in the multiple parallel path of power flow case in which generator or system element isolation would not be used, with a view to reducing generator acceleration within the generating segment and added two additional concepts, namely fault initiated at least momentary load shedding, optionally supplemented by fault initiated boosting of prime mover driving power both measures being executed in power receiving areas of power systems as a way of reducing deceleration of generators located in such areas and added the principle of response of prime mover driving power and connected load controls to the occurrence or non-occurrence or redevelopment of a line fault, when and if faulted line breakers were automatically reclosed.

Further, my second U.S. patent deals with the case wherein a generating station is tied to a power receiving system over parallel lines, and the power receiving system has a weak tie to a second power system, and it is an object of the fault initiated fast prime mover driving power and electrical load control system to not only prevent loss of synchronism of the generating station with the system that receives power from it directly, but to also avoid loss of synchronism of that system with the power system to which it is only weakly tied.

Thus, my two issued patents dealt with situations in which a fault on a line connecting two elements of a three element interconnection could cause loss of synchronism of any one element with the other two.

It was an aspect of both my two issued patents, and also a characteristic of prior art patent and literature references to provide means of avoiding development of instability of the generators of a generating station or generating segment or area of a power system when a fault occurred on one or more essentially radial transmission lines linking the generating station or generating segment of a system to a power receiving system, where the receiving system was viewed as essentially unitary, which is to say tending to behave dynamically as a single entity.

However, it was also an aspect of both of my issued patents to provide means of dealing with situations wherein a generating station or a power system or area of a system containing generating capacity is joined to a power system interconnection by lines which makes connection over disparate paths of power flow from the station, system or system element to dynamically independent components of the interconnection.

Thus, my issued patents show three power systems or segments or areas of a system, which contain generators and which are interconnected by three lines, and it is an aspect of both patents that control action initiated in response to a line fault is modulated as to extent and nature in response to the weighted sum of the power that is being transmitted prior to the fault over pairs of lines which represent disparate paths of inter or intra systems power flow.

Also, beginning in 1962, means not shown in my patents, or other patent literature, were described which afford a useful way to control fault initiated application of braking load and prime mover driving power, as also generation rejection, all with a view to prevention of system instability, which incorporate response to conditions obtaining subsequent to a disturbance (14, 18, 27).

Further, it has been proposed to employ rapid variations of the potential applied to grids of grid controlled A.C.-D.C. converters as means of rapidly changing power transfer to, from, or within interconnected power systems over high voltage direct current lines, as a way to counter tendencies to system instability when line faults occur on alternating current transmission lines of the interconnection (25).

Aside from what is described in my second patent, I *know of only three prior art approaches to what could be* termed event, as against drop in frequency, initiated load shedding, as follows:

(a) *load shedding* [carried out within a system that loses all connection with another system, and directed to avoiding] *responsive to the occurrence of reestablishment of a fault on automatic reclosure of faulted line circuit breakers following a fault on one of a group of two or more lines uniting an area of a system to the balance thereof employed as a way to retain synchronism and avoid a system separation (36).*

(b) load shedding effected via radio signals responsive to the event of a generator trip off, and directed to avoiding a system separation (37).

(c) *load shedding responsive to the event of loss of* [one but not all lines] *a single line uniting an area of a system to the balance thereof and employed as a way to prevent drop in frequency following separation (23).*

These references, it may be noted, do not cite event initiated combined load shedding and prime mover driving power boosting.

*Prior to the issuance of my first and the filming of my second patent there was filed in 1961 in the name of M. A. Eggenberger a U.S. patent application which disclosed an overspeed anticipation device taking the form of a fast acting means for effecting a closure of a turbine's control valves in response to a predetermined degree of deficiency of generator load relative to driving power, which application eventuated in U.S. Pat. No. 3,198,954, issued Aug. 3, 1965.*

*The basic concept of the patent was that a sudden drop in load would cause the device to initiate valve closing with a minimum of delay.*

*In the period following presentation of reference (40) a modified form of this device in which control action takes place in response to the quantity P–L where P represents turbine driving power as evaluated with a steam pressure transducer and L represents electrical load as measured with a Hall Effect watt transducer has been provided as a feature of a substantial number of turbine-generators furnished to customers of the two U.S. producers of large steam turbines-generators, as a way to initiate fast operation of intercepting valve actuator-oil dump valves and thereby initiate rapid momentary intercepting valve closure where to improve power system stability when threatened by line faults (47).*

*On Aug. 29, 1967, thus subsequent to the filling date of the parent patent of this reissue application, there was filed in the name of S. P. Moorganov, a patent application which represented a continuation of an application filed on May 8th, 1963, and which eventuated as U.S. Pat. No. 3,421,014, issued Jan. 7, 1969.*

*This patent resembles the present reissure application and its parent patent to the extent that it covers methods for very rapidly varying the driving power of power system steam turbine type generator prime movers in re-*

*sponse to the occurrence of events which operate to endanger system stability such as line faults and the momentary or sustained opening of inter or intra system time lines, and which could cause, or have caused, a system separation. Also, as in the present application and its parent, the Moorganov patent introduces the concept of employing an underfrequency responsive ralay as a way to temporarily "increase the rotational standby power power of the power system owing to a partial lift on the power rise limitations" (column 4, line 47, 48), which presumably could be rephrased as "a way to temporarily admit more steam to the turbine than could be safely admitted on a long term basis, and by this means boost turbine driving power" with the purpose of minimizing frequency drop if and when a system separation takes place.*

*However, the means of accomplishment proposed for use in Moorganov differs materially from that disclosed in the present application and parent patent in that in Moorganov the aproach is to employ*

*". . . a control channel to ensure control of the power of said prime mover under emergency conditions, said channel having means for forming primary control signals, feed back means connected to the input of said primary control signal means, compensating for said primary control signals depending on the influence applied by said control system to said primer mover . . ." (cf. column 30, lines 32 through 39).*

*In the above quotation the words "compensate for" would appear to require interpretation, since they do not appear to conform to U.S. usage, and it is assumed that in such usage it would be proper to substitute the terms "which are arranged to modify."*

*In contrast it is a feature of the present reissue application and of its parent patent as well as of U.S. Pat. No. 3,305,842 and Re. 26,571 of which it is a continuation in part that, while the control channel used to ensure control of the power of the prime mover under emergency conditions is fitted with means "for forming primary control signals," the further feature of "feed back means connected to the input of said primary control means" which are arranged to modify "said primary control signals depending on the influence of said control system to said prime mover" is not employed.*

*Rather in the present application and my issued patents the concept is to provide a turbin's control system with a preprogrammed signal or series of signals, without provision of other than conventional feed back response to turbine behavior, with fast acting control effected entirely on an open loop or feed forward basis with the nature of the signal determined in part by the nature of the system disturbing event, for example as to whether a line fault or a generator power output or sustained tie line power flow interruption due to reasons other than a fault, and if a fault, in response to the occurrence or nonoccurrence of a refault on faulted line reclosure following fault clearance (Re. 26,571) and, additionally on the basis of response to prefault station load and the magnitude and direction of transmission circuit loadings.*

*As it would seem, what has been stated just above can be phrased in the terminology of the Moorganov patent by stating that in my application and patents I employ what is referred to in the Moorganov patent as "discrete action systems" cf. column 3, lines 3, 11, 33).*

*However it is to be emphasized that my discrete action systems are arranged to respond to initial preemergency conditions, while by virtue of the prior art as exemplified by Griscom et al., the concept of providing so that control system response has relation to the severity of a fault would appear to be fully open to the public.*

*In a sense it appears that in the areas of intended use that are common, what Moorganov offers comprises feed back control features that supplement, and, in the inventor's view, represent improvements over what is shown in Griscom et al., in my patents and in the Eggenberger patent.*

Thus, there has been very substantial [recognition] *prior art consideration* of the need for *and means of providing* what I herein designate generally as "fast load control" [possibilities.] *procedures.*

*SUMMARY OF THE INVENTION*

Though there has been prior use of what I termed fast load control, heretofore utilized or proposed fast [load] *prime mover driving power* control systems *which repond on an open loop or feed forward basis to the occurrence of events, such as line faults, that operate to endanger system stability*, including those shown in my two issued patents, have been directed to improving the stability of power systems, whether large or small, under circumstances wherein the objective was to entirely prevent loss of synchronism and sustained interruption of power flow between any system power generating and power using elements of a power system in the event of a fault.

In contrast, the present invention is directed to favorably affecting the stability of large interconnected power systems by employment of fast prime mover driving power [and system connected electrical load] control means *and procedures* which are activated in response to events such as trip off of an individual generator for any cause, the trip off of all the generators in a power station due to the pulling out of step of the station generation as a whole, opening of a system tie line resulting in overloading of parallel paths of power transfer, whether or not resulting from a line fault, loss of a radially connected load or a radial connection to a power source which had been feeding power to an interconnection, and the termination or a sudden decrease or increase in power transfer over a D.C. line as a result of A.C.-D.C. converter control action, or other events, which cause or could cause the occurrence of sustained power flow interruptions involving either major changes in the amount of power transferred between two portions of an interconnected power system, *or*

[By way of illustration, the present invention provides a way to deal with] sustained interruptions of power flow over a group of transmission lines comprising at least two but not all lines of a power transmission system which unite a portion of the interconnection to the balance thereof by at least three lines.

Also in this, my invention offers a means of favorably affecting system stability [in the event of] *within an area of a system that separates from the balance of a system or within a system or area of system that separates from an interconnection of systems due to* lack of success in *entire* maintenance of system stability on execution of a line fault clearance.

In this connection, it is an aspect of my invention to set forth a novel way of modulating employment of fast load control used in the above connections, as in response to predisturbance values of system power flows.

Again, an aspect of my invention relates to provision of improved means of accomplishing prime mover driving power control and load shedding operations.

Thus, with reference to prime mover driving power control, most power system steam turbines which employ fossil fired steam generators are of the reheat type, and in relation to this point, are subject to limitations as to feasible speed of accomplishment of driving power changes, and it is a part of this invention to show how these limitations can be in considerable degree overcome by modified turbine design.

In addition, the present invention introduces the concept of fast, system disturbance initiated, momentary load shedding, together with preselected load type, short duration, sustained load shedding incorporating provision for progressive, time delayed, automatic reconnection, wherein controls, located in customers premises, and acting in response to power supply interruption applied to selected load areas and maintained for a controlled period which may comprise only a fraction of a second, or responsive to other signals, operate to deenergize selected load elements on a sustained basis, and thereafter automatically cause progressive reenergization over selected time periods, which can be varied as between customers to afford time diversity, and also adjusted to allow time for activation of system spinning reserve or quick start-up non-spinning reserve and/or rearrangement of system loads via changes in load-frequency control system settings.

To aid in making clear certain aspects of my invention, it may be desirable to bring out the point that, whereas employment of fast control of steam turbine driving power has been made use of by the power industry, over the years, it appears to have been applied only to non reheat turbine generators, and also always employed in only three connections, i.e.

(a) to neutralize cyclic tie line power swings (8, 29, 32)
(b) to rapidly boost the power generation of a power receiving system in the event of development of a condition of reduced system frequency.
(c) to minimize power swings over tie lines which unite power systems to steel rolling mills where the mill generates power with use of a non reheat-type steam turbine (29).

Under modern conditions small systems commonly are joined to form larger systems, large systems are joined with other systems to form pools, and pools are joined together to form superpools or large interconnections, with the effect that presently, for example in the U.S. east of the Rockies, about 130,000 megawatts of generating capacity are usually tied together (31), from which it follows that until synchronism is lost within the system, even the tripping off of a 1,000 megawatt generator will have little effect on frequency.

Thus, under conditions which we will designate as conditions applying to an "extended interconnection," the effect is that ordinary system disturbances do not alter frequency, appreciably which means that in the event of a system disturbance, speed governors play almost no part until they are eventually influenced by slowly acting, conventional load-frequency control equipment (31).

Accordingly, in an extended interconnection, any equipment for boosting turbine driving power that operates rapidly only in response to a system frequency drop will have no opportunity to function rapidly until and unless a portion of the system either pulls out of step, or is disconnected by tie line circut breaker action.

Thus, under extended interconnection conditions currently prevailing in the U.S., if a generator is tripped off the line in, say, the Consolidated Edison system, when that system is tied to its neighbors, and until such time as load-frequently controls have come into effect, every generator in the U.S. east of the Rockies that is not already fully loaded will try to contribute its proportional share to make up for the loss *in power supply that results,* which implies that for all practical purposes a surge or "inrush" of power nearly equal to the output of the [operator] *generator* that was tripped will [flow into] *be superimposed on pre-trip values of power flowing over* Consolidated Edison's [via its] ties to neighbors (24A).

Also, in the case of certain systems wherein presently non reheat turbine standby generators are normally run at low output, subject to automatic, fast driving power boost in the event of a frequency drop, the effect is or will tend to become that the turbines in question will fail to boost output in the event of a sudden loss of system generating capacity, except only in the event of a disturbance which causes system isolation, since frequency drop due to even a large loss in capacity will be small, and therefore difficult to distinguish from frequency changes that occur at times when fast output boosting of standby equipment would not be desirable.

In contrast, the fast load control features of the present invention provide means to rapidly activate system spinning reserve within a large interconnection and [the] simultaneously shed load rapidly, as also to apply electrical braking load and fast prime mover driving power reducingtion at other points of the system, optionally in combination with fast changes in power flow over D.C. transmission systems executed in response to A.C.-D.C. converter control signals which may be programmed to come into effect independently of frequency.

In respect to the load shedding aspect of the present invention, it may be noted that whereas the position of utilities has tended to be that load shedding should not be planned except by contract arrangement. However, in view of difficulties of the Nov. 9, 1965, U.S. northeast blackout, *it* may eventually be judged to be in the public interest that in the future power companies plan on more general brief automatic load shedding in the event of stringent contingencies.

In this connection, preselected load type, short duration load shedding offers a way to alleviate objections to load shedding that have hitherto prevailed, while also it will be easily recognized that such provision for load shedding would operate to afford advantages relative to ease and feasible speed of restoration of system voltage following an occasion of total voltage collapse.

With respect to the aspect of the present invention having to do with ability to rapidly boost output of reheat turbines, it may be noted that such capability can reduce need for load shedding, and also provides, a way to allow compensating for the appreciable delay in driving power build up in response to governor control point biasing that normally applies to other than low head water driven prime movers and to gas and non reheat type steam turbines.

It is an [aspect] *object* of my invention [that it] *to* describe[s] new ways to use known fast load control devices and combinations of such devices such as described in my issued U.S. Pats. No. 3,051,842, 3,234,397, and Re. 26,571 as aids to preservation of system stability whereby to enhance the utility of such devices.

[It is an] Another object of my invention *is* to provide a way of making effective use of [any appropriate type of] fast [load] *acting prime mover driving power means and combinations of such means with fast acting connected electrical load control means* [control procedure,] as an aid to preservation of the stability of an extended power system interconnection on the occasion of an event which either causes isolation of a power supplying or power accepting element of the interconnection or involves the interruption of power flow over at least two lines of a power transmission system which unites a portion of the interconnection to the balance thereof by at least three lines.

Another [aspect] *object* of my invention is to provide [a useful] *improved* ways of modulating employment of fast *acting prime mover driving power and connected electrical load control means* in extended power system interconnections in the event of a disturbance [comprising] *involving* a system power flow interruption wherein modulation is responsive to predisturbance values of system power flows.

Also, a further, related object of my invention is to provide control means, independent of system frequency, for initiating power system prime mover driving power boosting and load shedding in the event of development of a local power supply deficiency within a power system.

Another related object of my invention is to provide a means of fast boosting of driving power of prime movers, and fast load shedding which is adapted for use in power systems which represent components of an extended system interconnection.

Another object of my invention is to provide ways for improving the capabilities of power system reheat type steam turbines to execute rapid boosting of prime mover driving power.

Another object of my invention is to provide within an extended power system interconnection a system of momentary load shedding together with sustained, preselected load type shedding of load within customers' premises, coupled with provision to automatically reenergize progressively over a controlled time period.

Another object of the present invention is to provide an improved way by means of which both steam turbine and waterwheel driven generators may be utilized as source of power system spinning reserve generation.

Another object of my invention is to provide improved means of [fast load control including but not limited to employment of] fast prime mover driving power control and/or fast momentary and/or preselected load type, short duration load shedding which are adapted to usefully supplement methods that have heretofore been proposed and/or used for improving the ability of [such] *power* systems to resist development of system instability.

The subject matter which is regarded as the invention is particularly pointed out and claimed in the concluding portion of the specification. The invention, however, both as to organization and method of practice, together with further objects and advantages thereof, may best be understood by reference to the following description taken in connection with the accompanying drawings in which:

*DESCRIPTION OF DRAWING*

FIG. 2 is a diagrammatic representation of a control system adapted to favorably regulate fast load control means.

FIG. 3 comprises a curve showing a functional relationship.

FIG. 4 comprises a memory unit.

FIG. 5 comprises a load sheding and load shedding control system.

FIG. 6 comprises a modification of the load shedding system.

FIG. 7 comprises a reheat type steam turbine and an associated steam generator.

FIG. 8 is a control system diagram.

FIG. 9 is a system diagram showing provisions for fast activation of spinning reserve.

FIG. 10 is a further system diagram showing provisions for fast actuation of spinning reserve.

*DETAILED DESCRIPTION OF THE INVENTION*

Figure 1:
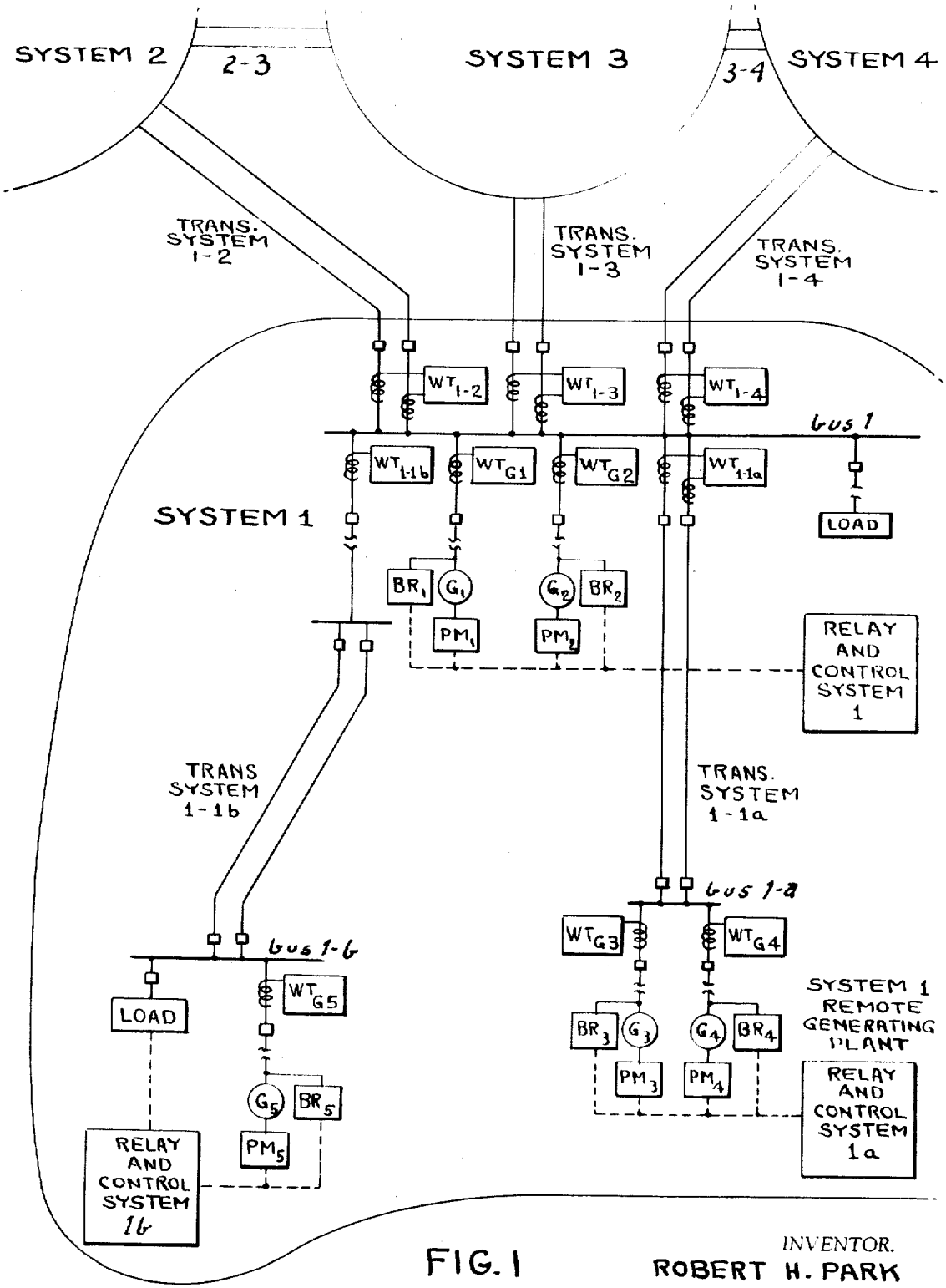
FIG. 1 is a diagrammatic representation of an interconnection of four power systems which is adapted to be operated with the present information.

Referring now to FIG. 1, system 1 is shown connected to each of systems 2, 3 and 4 by power transmission systems 1–2, 1–3, and 1–4, which, though shown as alternating current dual lines, could also be single lines, or a group of more than two lines, or could comprise or include a direct current system tie or ties, while also where some lines are shown of equal voltage, and some of different voltage, all could be of the same, or all of different voltages.

Systems 2, 3 and 4 are intended to represent elements of a large power pool or extended interconnection of systems, and are shown connected to each other by transmission systems 2–3 and 3–4 and also may be further interconnected, as through other lines of the interconnection of systems in which they are participants, yet may typically be dynamically relatively independent, or "integral," in that generator rotors of each system can be expected to swing relatively in the event of a fault on either of transmission systems 1–2, 1–3 or 1–4.

Power is generated within system 1 by generators $G_1$ to $G_5$ driven by prime movers $PM_1$ to $PM_5$.

Line and generator circuit breakers shown conventionally are to be understood as controlled by relay systems 1, 1*a* and 1*b*, which are to be understood as arranged to be responsive to system currents and voltages and to also be controlled in response to manual tripping, as also to the operation of or control by a number of automatic breaker trip initiation means that are commonly provided with a view to preventing catastrophic type boiler, turbine, and generator failures that could otherwise occur in the event of operating difficulties due to failure of equipment components (34, 35).

Watt transducers $(WT)_{G1}$, $(WT)_{G2}$, etc. are shown connected to current transformers, and also receive voltage inputs from voltage sources not shown, in such manner as to be responsive to generator power outputs, and total power flow over transmission systems 1–1*a*, 1–2, 1–3 and 1–4.

Also it is to be understood that relay system and watt transducer outputs are supplied as inputs to control systems 1, 1a and 1b, which incorporate various fast system load control means.

Elements $BR_1$ to $BR_5$ comprise generator braking resistor installations.

Dotted lines show paths of control.

It will be recognized by those skilled in the art that relay systems 1, 1a and 1b will normally incorporate a selection among various conventionally used (19) line fault, line overload, and out of step, and generator, transformer, and bus relays.

It will also be recognized that the operation of such relays can be used variously, alone or in conjunction with one or more already known types of power responsive or other controls (3, 4, 12, 14, 16, 18, 27) to program application of electrical braking load, fast boosting and bucking of prime mover driving power, and fast load shedding.

Thus, in particular, my issued and pending patents teach measures which can be employed to prevent loss of synchronism of generators $G_3$ and $G_4$ with the balance of the system in the event of a fault on a line of transmission system 1–1a or equally of generator $G_5$ in the event of a fault on transmission systems 1–1b, or of system 1 with the balance of the interconnection in the event of faults on transmission systems 1–2, 1–3 or 1–4, while also the same teachings have application in case of employment of D.C. transmission systems.

However, the concepts of the present invention go further in that, for example, they are directed to make provision to favorably influence system stability when, subsequent to a fault on a line of transmission system 1–1a, or in response to any other initiating event, as for example the pull out of generators $G_3$ and $G_4$, followed by out of step relaying, a sustained and entire interruption of power flow over transmission system 1–1a occurs, a fast load control system responsive to the initiating event is activated and caused to operate in a manner adapted to minimize the power inrush through transmission systems 1–2, 1–3 and 1–4 which tends to develop with loss of the power output of generators $G_3$ and $G_4$.

Also, the same concepts apply in relation to events which leads to sustained cut off of, or in the case of D.C. lines, to any major sustained reduction of power flow, over any of transmission systems 1–1a, 1–1b, 1–2, 1–3 or 1–4, or to the sustained termination of power supply by any system 1 generator as in relation to the tripping of a generator output circuit breaker, or otherwise.

In general, control effects needed will depend on various factors. Thus, the opening of the output breaker of a 600 mw. system 1 generator might well represent a less adverse event than the interruption of transmission system 1–3 power flow under a load of 600 mw.

For example, if system 1 were receiving 600 mw. over transmission system 1–2 and say 150 mw. over each of systems 1–3 and 1–4, which, in this instance, were one-half the voltage of transmission system 1–2, in the absence of fast load control the effect of interruption of power flow over transmission system 1–2 would be that the power supplied over transmission systems 1–3 and 1–4 would tend to increase to a total of 900 mw. corresponding to a 2 to 1 increase in load or to 3 times the original value, which might be much more than enough to cause system 1 to pull out of step.

In contrast, in the case in question, loss of 600 mw. of system 1 generating capacity would tend to boost total power flow over transmission systems 1–2, 1–3 and 1–4 from 900 to 1500 mw. which comprises an increase in load to 5/3 of the original value. Hence the amount of generator prime mover boosting and load shedding if any needed to preserve stability would differ markedly.

Also if a system 1 generator breaker were tripped open at no, or only light, generator load, or if power flow over any of transmission systems 1–1a, 1–1b, 1–2, 1–3, or 1–4 were interrupted, for any reason, at only light load, load shedding and/or driving power boosting would not be needed, but rather would be undesirable.

Again, tripping off of a generator or interruption of power flow over transmission systems 1–1a or 1–1b under heavy load could be unimportant if it occurred at a condition of light load on transmission systems 1–2, 1–3, and 1–4.

Accordingly, a system disturbance initiated, power responsive control is needed which controls differently in relation to the nature of the event or events, as also system conditions, with which the disturbance is associated, thus as to whether in relation to interruption of power flow over lines of transmission systems 1–1a, 1–1b, 1–2, 1–3 or 1–4, or to the opening of output circuits of generators $G_1$, $G_2$, $G_3$, $G_4$, or $G_5$, as also in relation to power limits and predisturbance power flows over transmission systems 1–2, 1–3, and 1–4.

In this connection, the effect of a system disturbance will sometimes [relates to] *give rise to hazard of or cause instability within a power receiving system or area of a system or interconnection of system in view of development of a* deficiency of [a system] prime mover driving power, [therefore tending] *within the receiving system, or area, the effect being* to retard space phase of prime movers, [and consequently call] *which, in turn implies a need* for fast prime mover driving power boosting and/or system load shedding, and, where D.C. tie lines are involved, for boosting of power flow toward or reducing power flow away from the system, while in other cases there will be an excess of prime mover driving power, therefore calling for fast prime mover driving power reduction, and/or electrical braking load application and generation rejection, and also boosting of power flow away from or reduction of power flow toward the system over D.C. lines.

Now, in this connection, if $P_1$=system 1 export power=power input to system 1 bus 1 from all sources other than such of transmission systems 1–2, 1–3 and 1–4 as [one] *are* of the A.C. type, less the system 1 bus 1 load and if $P_2$, $P_3$ and $P_4$=input to system 1 bus 1 over such of transmission systems 1–2, 1–3 and 1–4 respectively, as are of the A.C. type, it will follow that under all conditions $$P_1+P_2+P_3+P_4=0 \qquad (1)$$

so that if $P_1$ were suddenly altered by an amount $\Delta P_1$, it would follow that such change would be matched by sudden changes in $P_2$, $P_3$ and $P_4$, $\Delta P_2$, $\Delta P_3$ and $\Delta P_4$, which would necessarily conform to the relation $$\Delta P+{}_2\Delta P_3+\Delta P_4=-\Delta P_1 \qquad (2)$$

or say there would be $$\Delta P_{234}=\Delta P_2+\Delta P_3+\Delta P_4=-\Delta P_1 \qquad (3)$$

At this point consider the case wherein the system is operating under steady load conditions, when suddenly a portion of system 1 generated power is lost due to the tripping off of a generator, or in the event that input of power to system 1 bus over transmission systems 1–1a or 11b is suddenly interrupted, or in the case of a D.C. line, perhaps merely reduced.

Evidently, in such case, in an extended interconnection wherein appreciable frequency changes cannot occur, and with maintenance of synchronism, and subsequent to a period within which system generator rotors decelerate or accelerate, to take new relative positions, and also load is shed and prime mover driving power boosted, and/or D.C. line power flow toward bus 1 increased, it will tend to be true that $$[\Delta P_{234}=\Delta P_1=\Delta P_g-P_{sb}] \qquad (4)$$

$$\Delta P_{234}=-\Delta P_1=\Delta P_g-P_{sb}$$

where:

$\Delta P_g$=amount of system power input cut-off $$P_{sb}=L_s+P_b \qquad (5)$$

$L_s$=amount of load shed in system 1

$P_b$=a measure of benefit equivalent to load shedding that can be derived from as fast as feasible system 1 prime mover driving power boost plus effects due to fast regulation of power supply over D.C. lines if any although Equation 4 will not follow entirely, as there can be a drop in system voltage which can act to somewhat decrease system load.

However, in any case, the relationship of Equation 4 comprises a good general guide for use in relation to programming fast load shedding and prime mover driving power boosting.

Also, in relation to such of transmission systems 1–2, 1–3 and 1–4 as are of A.C. type, there will be a maximum limit of power flow toward system 1 bus that can be transmitted on a sustained load basis over the systems in question say $P_{234m}$ without development of instability, while also, as see FIG. 12 of reference (1), the maximum surge power $\Delta P$ that can be transmitted in a given direction over a single line initially carrying a load $P_o$ in the same direction, and where the power limit is $P_m$, is $$\Delta P=.73(P_m-P_o) \qquad (6)$$

Accordingly, and if $P_{234o}$ is assumed positive, which is the case of greatest practical importance, avoidance of loss of synchronism in the event of a disturbance due to loss of a system 1 generator, or to interruption of power flow toward system 1 bus over transmission systems 1–1a or 1–1b, would tend to require $$\Delta P_g-P_{sb}<K_{234}(P_{234m}-P_{234o}) \qquad (7)$$

where:

$P_{234o}$=value of $P_{234}$=P2+P3+P4 prior to the disturbance and $K_{234}$ is a numerical factor that can be determined by system studies, test, or experience, and would include consideration of steady state as well as momentary power limit, but which can have a value approximating .73.

Accordingly, to avoid loss of synchronism, it is necessary that $$P_{sb}>\Delta P_g-K_{234}(P_{234m}-P_{234o}) \qquad (8)$$

which can be taken to imply that to avoid hazard of instability $P_{sb}$ should be so adjusted that $$P_{sb}=\Delta P_g-K_{234}(P_{234m}-P_{234o})+kP_{234m} \qquad (9)$$

where k is suitably chosen as say in the range of 0.1 to 0.2.

On the other hand, in the general case where $P_{234o}$ is either positive or negative, it is necessary to take account of the fact that where $P_{234o}$ can be negative, Equation 6 has to be written in the form $$\Delta P=P_m f(P_o/P_m) \qquad (10)$$

where f(x) is a function such that, in the range x=0 to x=1

$$f(x)=.73(1-x) \qquad (11)$$

but which bends over for negative values of x generally as shown in FIG. 3 and has the value $f(x)=1.0$ at $x=-1$.

Accordingly, it follows that an appropriate relation for $P_{sb}$ in the general case of $P_{234o}$ either positive or negative should be sought in the form $$\Delta P_{sb}=\Delta P_g-P_{234m}f_{234}(P_{234o}/P_{234m})+kP_{234m} \quad (12)$$

where $f_{234}(P_{234o}/P_{234m})$ can be found by means of calculation or by test or experience, but will tend to resemble $f(x)$ as shown in FIG. 3.

If now power flow over transmission system 1–2 were to be interrupted suddenly, and assuming that at least one of transmission systems 1–3 and 1–4 is of the A.C. type, it would be equally in order to expect a relationship to hold of the form $$P_{sb}=P_{20}-P_{34m}f(P_{34o}/P_{34m})+kP_{34m} \quad (13)$$

and correspondingly in the event of interruption of power flow over lines 1–3 and 1–4.

Now, with respect to interruptions to power flow over transmission systems 1–1*a*, 1–1*b*, 1–2, 1–3, and 1–4, it is recognized that in the event of line faults, and where these transmission systems incorporate more than one line, it will normally result that a fault develops on only one line, and that line alone is isolated, and also usually isolated only momentarily except when the fault is of the permanent type, while ways of maintaining system stability in the event of this type of system disturbance have been extensively studied and provided for.

Accordingly, the present invention has been directed to dealing with those situations which have not heretofore been effectively dealt with, wherein as a result of any event, power flow over all lines of the transmission system is interrupted, as can occur as a result of out of step type (19, 33 ) or other (27) relay action, whether or not for good cause.

Accordingly, with this concept there is a need for a system that will develop control signal voltages generally as given by Equations 12 and 13 for use in modulating the operation of load shedding and prime mover driving power boosting means.

FIG. 2 comprises such a system.

Thus, referring to FIG. 2, memory units 1 through 10 are connected to receive as a component of their voltage inputs the outputs of all power transducers located in the system 1 high voltage bus area, and also [telemetering] *telemetered* transducer outputs of generators $G_3$, $G_4$, and $G_5$ shown under designations $(WT)'_{G3}$, $(WT)'_{G4}$, and $(WT)'_{G5}$.

In addition, memory units $M_1$ through $M_7$ receive supplementary voltage inputs comprising D.C. voltage source $V_1$ which is made suitably proportional to $-P_{234m}$ plus the sum of the outputs of transmission systems 1–2 and 1–3 and 1–4 power transducers, except reduced in the ratio $K_{234}$ to 1, by means of a dropping resistor having branches $(K_{234})r$ and $(1-K_{234})r$ and modified by the effect of rectifier RECT, plus the voltage of D.C. voltage source $V_2$ which is made proportional to $+kP_{234m}$.

FIG. 4 shows that memory unit M consists of a quick acting relay 5 wherein normally closed contacts make a path to allow charging a condenser C through a resistor R by supply of voltage to terminals 7 and 9, while when coil 11 of the relay is energized, the circuit through R is interrupted and the terminal of the condenser adjacent to R is connected to terminal 13 which in FIG. 2 is connected to the lead to terminal 1, while terminal 7 is connected to the lead to terminal 3.

Returning now to FIG. 2, proper operation requires the selective activation of memory devices by sustained energization of coil 11 of the appropriate device, as per the schedule following:

| Power interruption: | Memory unit |
|---|---|
| Generator $G_1$ output | **1** |
| Generator $G_2$ output | **2** |
| Generator $G_3$ output | [5] *3* |
| Generator $G_4$ output | [6] *4* |
| Generator $G_5$ output | [7] *5* |
| Transmission system **1–1**a (all lines) | [3] *6* |
| Transmission system **1–1**b (all lines) | [4] *7* |
| Transmission system **1–2** (all lines) | **8** |
| Transmission system **1–3** (all lines) | **9** |
| Transmission system **1–4** (all lines) | **10** |

More than one method of effecting desired selective energization of memory units can be used. For example, in the case of generator circuits it would normally be desirable to energize memory unit relays from a suitable power source via a normally open latching type relay which closes and latches-in when the generator output circuit breaker trip circuit is energized.

However, at the sacrifice of a loss of speed of control system response, it would also be possible to energize through a latch-in type relay arranged to be energized by generator breaker auxiliary contacts which close when the breaker opens.

Again, it would be possible to energize in response to the operation of a control device which becomes operative in anticipation of a need, or only a possible need, to trip the generator breaker, and as part of a cycle in which fast load control is applied and the generator breaker tripped, if at all, only after a delay. For example, a power swing type relay (27) could be employed as a means of anticipating the possibilty of development of generator pull out.

Also, generally similar considerations apply to energization of relays of transmission system memory units except that provision needs to be made so that energization of the relay of the appropriate memory unit is only accomplished when entire power flow over all lines of a radial transmission system such as 1–1a, or 1–1b, is interrupted, and when entire power flow over all lines of selected groups of all lines uniting system 1 to the balance of the interconnection is interrupted.

In FIGS. 1 and 2 the group of all lines uniting system 1 with the interconnections that were selected comprised.

| | Transmission system | Description |
|---|---|---|
| Group: | | |
| 1 | 1–2 | All lines uniting systems 1 and 2. |
| 2 | 1–3 | All lines uniting systems 1 and 2. |
| 3 | 1–4 | All lines uniting systems 1 and 4. |

However, other groupings could have been used.

For and merely by way of example, if group 1 above comprised two parallel or double circuit lines uniting system 1 and system 2 over one path, and two other parallel or double circuit lines doing so over a different path, it could be considered desirable to add sub groups to the above table, as below

| | Transmission system | Description |
|---|---|---|
| Group: | | |
| 1a | 1–2 | Two lines following path a. |
| 1b | 1–2 | Two lines following path b. |

with the thought in mind that system disturbance initiating events, such as a windstorm, lightning, crash of an airplane, etc., could act to cause a permanent fault on both lines or circuits of group 1a, while group 1b could yet remain intact, and vice versa.

Yet, at the same time, if system 2 pulled out of step with the interconnection, it would still be necessary to open all lines of transmission system 1, comprising all group 1 lines of the total transmission system comprising the combination of transmission systems 1–2, 13, and 1–4, which operate to unit system 1 to the interconnection.

Accordingly, if control in response to power flow over line groups 1a and 1b were to be made a part of the fast load control system, it would yet be desirable to retain power flow over all group 1 lines as in FIG. 2 signal generation control means, and to add two more memory units 11 and 12 which would be arranged to receive appropriate watt transducer inputs.

As regards details of how to energize memory units, where response is to be had in relation to opening of all of a selected group of line breakers, for example all the breakers of each transmission systems 1–1a, 1–1b, 1–2, 1–3, or 1–4, a suitable procedure would be to provide each line breaker with a latch-in relay which would close its contacts on a sustained basis when the breaker trip coil was energized, and to connect the contact circuits of the relays corresponding to each group in series.

However, where a group, such as group 1, has sub groups, such as sub groups 1a and 1b, it would also be necessary to provide so that when all lines of group 1 were tripped, a relay would be energized which opened the circuit to coils 11 of the sub group memory units, and only acted to energize the group 1 memory unit after a delay sufficient to allow the sub group memory unit relays to drop back to their non-energized positions, or alternately some equivalent system, as with use of rectifiers, whereby to avoid discharging the condenser of group 1 memory unit into a sub group memory unit condenser.

Again, it would be possible to energize transmission system memory units other than in response to energization of breaker trip circuits, and, in particular, provision to activate fast load control in response to some type of relay, or other information source, that would give advance notice of a probability of a system, as say system 1 or 2, pulling out of step with the interconnection would often be desirable.

Accordingly, it is a part of my invention that the option may be exercised of providing for activation of memory units other than in response to line breaker tripping, and accordingly, with a view to rapidly initiating and controlling type and amount of fast load control, by means which respond to an event which could or might be expected to cause a power interruption. Thus, to be specific, memory units could be activated in advance of energization of line breaker trip coils by use of power swing relays (2, 3, 4, 27), voltage dip relay (3, 4) acceleration detection relays (6), generator momentary speed responsive control (18), generator vs. system displacement angle units (14), and certainly other types of relays or controls, as also in response to a purely manually aplied signal.

At this point it is proposed to return to consideration of the special case of interruption of generator power output in response to an output circuit breaker trip signal, and to the way in which the circuits of FIGS. 4 and 2 cooperate.

Thus, evidently, if resistor R is large relative to resistor r, as is to be understood has been provided, and if generator 1 receives an output breaker trip signal during an otherwise undisturbed system condition, and if memory unit $M_1$ relay 5 acts faster than the operation of power flow interruption, which would also be provided for, memory unit $M_1$ will memorize and develop between signal generator output terminals 1 and 3 a voltage proportional to $$P_{sb}=P_{G1}-K_{234}(P_{234m}-P_{234o})+kP_{234m} \quad (14)$$

up to the point where $K_{234}(P_{234m}-P_{234o})=P_{234m}$ which occurs when $P_{234}=-(1-K_{324o})P_{234m}$, while in view of rectifier RECT, for more negative values of $P_{234o}$ the voltage will be simply $$P_{sb}=P_{G1}-(K_{234}-k)P_{234m} \quad (15)$$

Relations (14) and (15) together provide a rough approximation to Equation 12, and are on the safe side.

Also, similar results will apply in the event of tripping off of generators $G_2$ to $G_5$ and also with interruption of power flow over transmission systems 1–1a and 1–1b.

Also, by further reference to FIG. 2, it will be clear that sudden interruption of power flow over transmission systems 1–2 from an initial steady load condition will produce values of $P_{sb}$ corresponding to a modified form of equation 13

$$P_{sb}=P_{2o}-K_{34}(P_{34m}-P_{34o})+kP_{34m} \quad (16)$$

up to the points respectively that $K_{34}(P_{34m}-P_{34o})=P_{34m}$ and beyond this point to a value of $P_{sb}$ $$P_{sb}=P_{2o}-(K_{34}-k)P_{34m} \quad (17)$$

Also, similar results, but with an appropriate change of notation, would apply to interruption of power flow over transmission systems 1–3 and 1–4.

Again if, for example, transmission system 1–2 represented a D.C. line, Equations 14 and 15 would need to be modified by replacing $K_{234}$, $P_{234m}$, and $P_{234o}$, by $K_{34}$, $P_{34m}$ and $P_{34o}$, while Equations 16 and 17 would still hold, except that if power flow over the D.C. line toward bus 1 were merely reduced by an amount $\Delta P_2$, instead of wholly cut off, $\Delta P_2$ would replace $P_{2o}$ in Equations 16 and 17.

To obtain desirable performance in respect to signal generation, account has to be taken of the fact that if generator breaker tripping or line fault interruption occurred only subsquent to a line fault followed by line fault clearing with reclosing, and perhaps with use of fast load control including application of braking resistors, fast prime mover driving power control, and load shedding, the transducer output that acted to determine $P_{sb}$ would be subject to variations due to dynamic phenomena related to generator rotor oscillations, and by virtue of this fact would, in general, fail to operate to determine average value of power in rush over transmission systems 1–2, 1–3, and 1–4, and the therefore it could be desirable that R and C be so chosen that the quantity RC representing the condenser charge-discharge time constant was large enough to at least partially mask such effects.

In practice, best value of RC could be determined by suitable system studies carried out in application to situations or in relation to classes of cases, for example as between what would best apply in relation to opening of generator output circuits, and what to transmission system power flow interruptions, and, especially in relation to the case of transmission systems the matter of natural period of dynamically integral system elements, united by the system, and adapted to be set in relative oscillation, as by fault clearance programs that might ultimately result in the opening of the breakers of all transmission system circuits.

In the light of these considerations it would appear preliminarily that results of studies might be expected to show that suitable values of RC would lie generally in the range ½ to 10 seconds.

It will be noted that it has been necessary in what went before to make a distinction between transmission systems such as systems 1–2, 1–3 and 1–4 which tie system 1 to the interconnection, and transmission systems such as systems 1–1a and 1–1b that do not.

This distinction would apply and hold true independently of the number of transmission systems involved of each type.

In the event of connection of system 1 to the interconnection over N transmission systems, the interruption of power flow over any one system would be handled by the same type of circuit as shown in FIG. 2 but with appropriately modified parameter values as also designations. Thus, as to designation, the power limit designations applying either to loss of a generator in or interruption of power flow over a radial transmisison system in system 1 could be written without ambiguity simply as K, P, and $P_m$, while coefficient K and power and power limit applying in the event of interruption of a group, say group $g_1$, of lines connecting a portion of a system interconnection to the balance of the interconnection could be written without ambiguity as $P_{g1}$, $K_{g1}$, say $P_{m(g1)}$ and $P_{(g1)}$ respectively.

Thus, in the general case the signals would be, for isolation of power supply of receiving system element, as per Equations 14 and 15, except replacing $K_{234}$ by K and $P_{234m}$ and $P_{234o}$ by $P_m$ and $P_o$, and for interruption of power flow over a group of lines $g_1$ uniting a portion of an interconnection to the balance of the interconnection, as per Equations 16 and 17 except replacing $K_{34}$ by $K_{g1}$ and $P_{34m}$ and $P_{34o}$ by $P_{(g1)m}$ and $P_{(g1)o}$.

It is recognized that more advanced means of deriving a signal voltage having a magnitude indicative of need to program desirable extent of fast load control activity could be devised, and also that further study, or experience, could and probably will reveal the desirability of taking explicitly into account, dynamic phenomena such as can arise prior to full interruption of power flow over a transmission system, and especially dynamic conditions that can develop during lengthy faulty periods and processes of going out of step.

While more versatile means of control can be devised, they evidently could be delt with as in the nature of adjunct improvements to the system herein shown which could be brought into effect in the form of supplementary voltages added to the memory unit inputs and outputs of the FIG. 2 signal generator.

With a quantitative signal made available, by whatever means, there remains a need for a control scheme which will react suitably. Such a scheme is shown in FIG. 5.

Thus, referring to FIG. 5, voltage appearing across terminals 1 and 3 of the signal generator of FIG. 2 is shown applied to a circuit comprising resistor 15, rectifier 17, and the axle end of wiper arm 19 of fast operating stepping switch 21, and from the contact end of the wiper arm to any one of a first bank of stationary contacts 23, and thence back to terminal 3. Amplifier 25 actuates fast relay 27 in response to voltage across resistor 15, while relay 27 in turn energizes stepping motor 29.

Resistor 31, which is preferably chosen larger than resistor 15, bridges across stationary contacts 23, with the result that appearance of more than a minimum signal voltage across terminals 1 and 3 will cause the stepper to step to a position generally proportional to the signal.

Stepper switch 21 is provided with a second bank of stationary contacts 33 which operate in conjunction with a progressive shorting sector wiper 35 to apply battery voltage progressively to contacts 33, each or at least some of which, as here illustrated in relation to the first of contacts 33 only is connected so as to control the opening of at least one system load feeder circuit breaker.

Automatic feeder breaker reclosing is an aspect of the invention. The process of automatic reclosing may be inherent in the breaker on the basis of a preset but not necessarily uniform reclosing time for each breaker, or may be made such that reclosing occurs only when the breaker trip signal is removed with control of instant of removal, as by the action of one or more time delay circuit opening relays, such as relays 39 and 41, which also could be selectively energized from any of contacts 33, or otherwise, operated selectively by supplementary fast load control means not herein detailed, and which could also be made to operate in response to type of system disturbance, as for instance whether or not involving interruption of power flow over transmission systems 1–2 or 1–3, or in response to presence or absence of dynamic phenomena occurring in advance of activation of memory units.

As also shown in FIG. 5, means may be provided in customers' premises so that lighting and/or other load that would be advantageously kept as fully energized as feasible during load shedding, is reenergized as soon as the feeder breaker recloses, whereas other load, such as, in the case of residences, water heating, electric ranges, refrigerators, oil burners, home heat, etc., is temporarily disconnected as for example by the opening of contactor 43 with reclosing determined by fast opening time delay reclosing relay 45.

Evidently, customers' load may be subdivided into portions some of which are reenergized after one time period and some after another, as by providing additional contactors and relays.

Also, as important to achievement of system diversity factor with respect to time of pickup of system load subsequent to initiation of load shedding, closing time of time control relay 45 would preferably be varied as between customers.

As an alternate fast load shedding method, which could prove useful, as especially in relation to the shedding of selected portions of industrial loads, selective shedding could be accomplished as per FIG. 6 wherein a remotely controlled, fast opening, time delay reclosing relay 47 controls fast opening contactor 43 in response to signals supplied over a suitable communication channel such, for example, as a telephone circuit.

So far what has been shown relates to load shedding.

However, in the event availability of fast load control means in the form of fast generator prime mover driving power boosting capability and/or capability of either rapidly boosting system 1 input power or reducing output power over D.C. lines, provision to rapidly implement such means either directly in response to power boost signal generator voltage, or in response to an associated stepping switch or other supplementary signal responsive control would be in order, either alone or supplemented by fast load shedding.

Evidently, a simple means of accomplishment would be to apply FIG. 2 signal generator output directly to a suitable voltage responsive turbine control such as utilized in equipment described in references (29), (8) and (22), which could include phase advance and/or other antihunting features, or to a suitable voltage responsive D.C. transmission system rectifier or inverter output control unit, as illustrated in FIG. 8.

In this there would be the point that boosting steam turbine output can require ½ to 1 second (29, 8), so that in use of turbine output boosting, supplementary provision for employment of at least momentary load shedding could often be desirable.

In relation to prime mover driving power boosting, in cases where slow driving power response waterwheel driven generators are in operation as say at a remote generating plant, at less than full load, and hence available as system spinning reserve generation, while also one or more base load reheat turbines are in operation, there is the point that with provision for turbine valving downstream of the reheater, the energy stored in the turbine reheater as also with availability of valving to allow high pressure turbine bypassing, also the energy stored in the superheater can be made use of to provide momentary large turbine driving power boost for the period of possibly 4 to 10 seconds that could be required to bring the waterwheel driven generator unit up to full output.

Here various means of accomplishment would be feasible, as to which two possible systems are shown in FIGS. 9 and 10.

Thus, referring to FIG. 9, the steps of the stepper unit of FIG. 5 could be used to implement a telemetered boost message to a remote waterwheel driven generating plant while the local steam turbine unit could be supplied directly with a driving power boost voltage signal which would be cut back after a time period by fast closing time delay opening relay 65.

Again, a possibly desirable alternate procedure could be that shown in FIG. 10 wherein, on say the first step of the stepper relay, both of dual fast opening valves 49*a* and 49*b* open, while after a time delay period controlled by fast closing time delay opening relay 67, valve 49*b* recloses.

Whereas we have up to now dealt with a condition in which a deficiency of power supply to system 1 develops, it also needs to be recognized that the reverse problem can arise, as when system 1 primarily exports, rather than receives power over any of transmission systems 1–1*b*, 1–2, 1–3, or 1–4, in which case there can be a need to apply braking load and [a] *to* reduce system 1 generator prime mover driving power, with a view to preventing loss of synchronism of system 1 with the interconnection.

In this it will be clear that handling of power export conditions can be dealt with by use of precisely the same type of control signal development circuit shown in FIG. 2 except with exclusion of generator power output and transmission system 1–1*a* circuits, which could have no function since these circuits do not absorb load under normal conditions. Also, transducer connections would have to be reversed, i.e. transducer voltages would represent power outputs from system 1 bus, rather than power inputs. Also it will be evident that FIG. 5 could also be used to momentarily apply braking load, and to program fast reduction of prime mover driving power, with provision to activate not only braking units $BR_1$ and $BR_2$ of FIG. 1 but also, when desirable, units $BR_3$, $BR_4$ and $BR_5$ in response to line carrier or other communication channel signal, while the arrangement of FIG. 8 would apply in relation to prime mover and D.C. line power flow control.

In what has gone before there has been reference to problems of rapidly controlling driving power of steam turbines.

In this connection, momentary steam turbine driving power reduction by fast valving, though limited in speed by steam entrainment effects, is facilitated by the fact that turbines are conventionally designed to close valves rapidly in order to prevent overspeeding on loss of load.

However, the great bulk of power system turbine generators utilize reheat type turbines which, as previously noted, introduces certain problems. Thus, in relation to fast boosting of reheat turbine driving power, delay results in response to opening of the turbine control valves by virtue of the fact that it is necessary to increase reheater pressure before flow to the intermediate and low pressure turbines is influenced, and the further fact that due to the volume of the reheater, the time constant of such changes is typically 5 to 20 seconds.

Accordingly, in the case of turbine-generators of present type, it tends to be true that in starting from an initial stable load condition, with the intercepting valve already wide open, only the high pressure turbine can respond rapidly to a process of fast control valve opening.

Beyond the foregoing, there is the further problem of there being a very substantial economic incentive to run turbines at their best point, which means with control valves all the way open, in order to achieve favorable fuel economy. This, in turn, tends to imply inability to increase driving power.

In this, ways of boosting power which can be applied notwithstanding turbine operation at best point that have been recognized (13, 20, 26) and used, include:

(1) Bypassing feedwater heaters
(2) Increasing spray water ahead of final superheater and reheater
(3) Bypassing the high pressure turbine.

However, these procedures do not avoid delay in response of the intermediate and low pressure turbines incident to time required to fill the reheater.

In relation to boosting reheat turbine driving power the present invention shows how to speed response by providing either a bypass around one or more stages of the intermediate pressure turbine, including the first stage, or a variable area nozzle system ahead of the first stage wheel of the intermediate pressure turbine, in either case with the effect that capability of a rapid boost in driving power of the intermediate and low pressure turbines is achieved.

In relation to boosting driving power it is evident that steam stored in the reheater represents a momentary source of turbine driving power which has the benefit of being immediately available, and which will also tend to be sustained for a period related to the reheater time constant, while with fast response so achieved, boosting on a continued basis will be possible by supplementary employment of measures (1) to (3) as above, as also by control valve action in the case of turbines not operating at full load, and by utilizing measures adapted to increase steam generation, such as providing and bringing into use steam generator [for] overcapacity [and] *by* supplementary gas fuel supply, and means to heat feedwater with gas.

To accomplish these results, I employ a steam generator and turbine control system as shown in FIG. 7.

Referring now to FIG. 7, the diagrammatic representation contained therein discloses a steam turbine installation comprising high, intermediate and low pressure turbines with a reheater located between the high and intermediate pressure units, generally as shown in U.S. Pat. 3,055,161 to J. I. Argersinger et al., and wherein common elements are identified in FIG. 7 with like numbers, except with provision to bypass not only the high pressure turbine, but also at least one and preferably several stages of the intermediate pressure turbine, beginning at the first stage, or even to bypass all stages, with employment of valves 49 and 51 in parallel, where valve 49 can represent a quick acting, electrically controlled open or shut type valve, and valve 51 represents a small bleed valve.

Valve 53, which controls application of spray water to desuperheater, 55, is in series with water flow control valve 57 which is to be understood supplied with a suitable source of spray water.

Valves 49 and 53 are normally closed, but are adapted to open rapidly when activated by control unit 59 in response to signals received by signal generator unit 61, which could comprise respectively the devices of FIG. 5 and FIG. 2.

With the arrangement as shown, when a turbine driving power boost signal is received, valves 49 and 53 would rapidly open and immediately increase the flow of steam through the intermediate and low pressure turbines by drawing on the stored steam in the reheater.

As this occurs, the reheat pressure would drop, causing an increased amount of power to be developed in the high pressure turbine, thereby in part tending to compensate for reduction in pressure of steam available for driving the intermediate pressure turbine.

The spray system, complete with bypass water separator, is provided to reduce the temperature of the steam entering at the intermediate admission point of the intermediate pressure turbine, with a view to reducing turbine rotor and casing thermal stresses.

Valve 51 is held partly open to constantly bleed steam in order to keep the bypass water separator and the piping hot, while also a similar valve 165 would be provided around valve 62 in each case in order to prevent excessive condensation effects when bypassing is suddenly resorted to.

If determined to be desirable, valve 49 could comprise a fast acting, servo operated, control type valve with electrical controls generally similar to the intercepting valve shown in U.S. Pat. 3,097,488, M. A. Eggenberger et al. (22) and therefore could be controlled directly from signal generator voltage. However, turbine intercepting valve 129 in FIG. 7 would also preferably be of the type in question, thereby allowing controlled rapid reduction in turbine driving power when wanted in response to signal generator voltage, and providing a means of fast modulation of steam flow to the intermediate pressure turbine which would be operative were valve 49 chosen to be of the merely open or shut type.

Again, as a further and possibly preferably means of accomplishing the basic objective of providing a way of rapidly boosting the driving power of reheat type steam turbines, I propose that the nozzles of the first turbine stage following the reheater be made of variable area, using for the purpose a construction generally along lines commonly employed in gas turbines produced by the General Electric Co. (U.S.), and also described in U.S. Pat. 2,651,496, Buckland et al.

As to details of construction, it will be recognized that prevention of leakage of steam at high pressure would presumably make necessary or desirable enclosing the operating mechanism in a pressure tight shell which, however, it is judged, would not represent a difficult technical problem.

Also, in relation to provision of variable area nozzles, it will be clear that considerable simplification would be possible over what is shown in the patent reference in that the nozzles would be applied to the intermediate pressure turbine first stage, while also with provision for modulation of intercepting valve opening, it would be possible to operate the variable nozzle area mechanism as a 2-position system, i.e., a normal position, and a further open flow boost position.

As pertinent to the invention, there is the point that for turbines which use dual reheat, i.e. turbines with reheaters ahead of the second and third units, each of these units could be provided with bypass valving, or alternatively with variable area first stage nozzles.

Evidently it would be possible to also employ fast bypassing of feedwater heaters and boosting of superheater and fast application of reheater sprays as a supplementary means of increasing steam development.

Further, as a relevant aspect of the invention, there is the point that it appears feasible to provide so as to allow boosting of output of steam generators by 20 or more percent for a period of an hour or less by merely going to the relatively small capital expense involved in providing added combustion air fan and fuel supply capacity, which therefore often could be desirable especially when it is borne in mind that under modern extended interconnection conditions, even subsequent to system disturbances, reserve power requirements of other than short duration presumably could usually be arranged via power flow over system ties given a period of say 5 minutes to one half hour to allow rearrangement of intersystem power flows.

In respect to water sprays, there is also the point that where fast flow changes are contemplated, water spray quantity would preferably be correlated directly with steam flow or steam flow valve opening, rather than controlled only in response to temperature as in the Argersinger patent.

Thus in this connection spray control could be related in the first instance and rapidly to steam flow, with added supplementary slow acting temperature control if wanted.

In the matter of practical means of accomplishment of fast load control but which are not deemed to constitute a patentable aspect of the present invention, it may be worthy of note that it is possible to employ certain useful procedures in relation to fast reduction of prime mover driving power.

For example, in fast valve closing of intercepting valves, there has been expression of concern on the part of some engineers as to chance of damage to valve seats if fast closing is too often employed, while further there has been concern as to blowing of high pressure safety valves with fast closing of turbine control valves, in view of the fact that blowing such valves tends to cause leaking, which, in turn, will continue until a complete turbine shutdown period.

However, I propose to avoid these problems by only partially closing the intercepting valve, in response to employment of servo control, or by at first only closing the intercepting valve partially, and thereafter further closing it at reduced speed, whereby to avoid mechanical damage, while also I propose to avoid operation of the high pressure safety valves by providing fast acting and fully commercially available dump valves, which are programmed by the fast turbine control system to dump high pressure steam, either to atmosphere, or, preferably, to the turbine condenser, with concomitant supply of spray water for cooling purposes.

Again, a generally similar bypass to the condenser could always be used to prevent operation of the reheater safety valves, although it is understood that from a practical standpoint advantages derived may be unimportant.

Again, in relation to fast reduction of prime mover driving power, a problem can arise in that speed of intercepting valve opening is commonly somewhat restricted with a view to minimizing possible turbine overspeed hazards.

Where only a brief reduction of driving power is wanted, a problem could arise if the intercepting valve were fully or nearly closed, in that in some cases delay in reopening would offer disadvantages. However, this problem can also be reduced in scope by the procedure of providing so as to only partially close the intercepting valve in response to suitable servo system control.

Also, it will be clear that where a sudden, sustained drop in driving power of a reheat type turbine is wanted, it will be only feasible to achieve desired results by using the intercepting valve as a steam flow modulation device to supplement control valve modulation of steam flow to the high pressure turbine which, however, it is judged can be accomplished by those skilled in the art merely with application of generally known practices (21, 22).

Throughout, in what has gone before, numbers in parentheses in the text have been supplied in reference to the table of references below, which has been made use of as a convenient means of presentation of pertinent technical information already known in the art.

(1) "System Stability as a Design Problem," R. H. Park and E. H. Bancker, Trans. AIEE January 1929, vol. 48, p. 170 et seq.

(2) "Governor Performance During System Disturbances," R. C. Buell, R. J. Caughey, E. M. Hunter, and V. M. Marquis, Trans AIEE March 1931, vol. 50, p. 354 et seq.

(3) U.S. Pat. 1,834,807, "System of Electrical Distribution," W. Skeats, Dec. 1, 1931.

(4) U.S. Pat. 1,935,292, "Regulator System," S. B. Griscom and C. W. Wagner, Nov. 14, 1933.

(5) U.S. Pat. 2,285,203, "Control Equipment," F. A. Hamilton, Jr., June 2, 1942.

(6) "Report of the International Study Committee No. 13: System Stability and Voltage Load Frequency Control," Bo G. Rathsman, CIGRE Report 336, 1952, p. 6.

(7) U.S. Pat. 2,651,496, David Buckland et al., Sept. 8, 1953.

(8) "Controls for Operation of Steam Turbine-Generator Units," O. N. Bryant, C. C. Sterrett, D. M. Sauter, Trans AIEE February 1954, vol. 73–IIIa, p. 79 et seq.

(9) "Load Reduction by Underfrequency Relays During System Emergencies," W. C. Gierisch, Trans AIEE February 1955, vol. 73 III–B, p. 1651 et seq.

(10) "Application and Test of Frequency Relays for Load Shedding," L. L. Fountain and J. L. Blackburn, ibid., p. 1660 et seq.

(11) "Automatic Load Shedding," AIEE Committee Report, Trans AIEE December 1955, vol. 74, p. 1143 et seq.

(12) "Increasing the Reliability of Operation of Power Systems and Long Distance Transmission Lines", D. I. Azaryev, L. G. Mamikonyants, I. A. Syromyatnikov, and A. A. Venikov, CIGRE Report No. 318, 1958.

(13) "Large Steam Turbine Generators With Spinning Reserve Capacity," J. E. Downs and E. H. Miller, 1960 American Power Conference.

(14) "The Use of Repeated Electrical Braking and Unloading To Improve the Stability of Power Systems," V. M. Gornshtein and Ya. N. Luginskii, Electric Technology U.S.S.R., vol. 2, 1962, p. 292.

(15) U.S. patent application Ser. No. 219,711, "Means for Maintaining Stability of Power Transmission Systems Nothwithstanding a Fault," R. H. Park, filed Aug. 27, 1962, *which issued as U.S. Pat. 3,234,397 on Feb. 8, 1966, and was subsequently reissued on Apr. 29, 1966 as U.S. Pat. Re. 26,571.*

(16) U.S. Pat. 3,051,842, "Means for Maintaining Stability of Power Transmision Systems During a Fault," R. H. Park, Aug. 28, 1962.

(17) U.S. Pat. 3,055,181, "Method of Operating a Power Plant System," J. I. Argersinger et al., Sept. 25, 1962.

(18) "The Stability of a Hydro-Electric Generator With Electric Braking," D. Ye. Trofimenko, Electric Technology U.S.S.R., vol. 1, 1962, p. 70.

(19) "The Art and Science of Protective Relaying," C. Russell Mason, John Wiley & Sons, Inc., New York, 1962.

(20) "Advisory Committee Report No. 1 on Methods of Carrying Peak Loads and Methods of Reducing Peak Loads," Federal Power Commission, January 1963.

(21) U.S. Pat. 3,097,490, "Electro-Hydraulic Control System for Turbine With Pressure Feedback," P. C. Callan et al., July 16, 1963.

(22) U.S. Pat. 3,097,488, "Turbine Control System," M. A. Eggenberger et al., July 16, 1963.

(23) "A Selective Load Shedding System," G. D. Rockefeller, Westinghouse Engineer, November 1963.

(24) "Coordinated Regional E.H.V. Planning in the Middle Atlantic States, U.S.A.," J. A. Casazza, R. W. Werts, W. B. Fisk, E. S. Van Nostrand, CIGRE Report No. 315, 1964.

(25) "Parallel Operation of A-C and D-C Power Transmission," Peterson, Reitan and Phadke, 1964 IEEE International Convention Record, p. 84 et seq. See also Trans. IEEE-PAS 1965, pp. 15–19.

(26) "National Power Survey—Federal Power Commission—1964," part 1, pp. 125–127, U.S. Government Printing Office.

(27) "A Power Swing Relay for Predicting Generation Instability," R. D. Brown and K. R. McClymont, IEEE No. 65–90, Winter Power Meeting, 1965.

(28) "Boiler-Turbine Coordination During Startup and Loading of Large Units," F. J. Hanzalek and P. G. Ipsen, ASME No. 65–WA/PWR–9, December 1965.

(29) "25/41 MW Cyclic Steam Power Plant Serves Hot Strip Steel Finishing Mill," D. V. Fawcett, IEEE No. 65–36, Winter Power Meeting, 1965.

(30) "Dynamic Stability of the Peace River Transmission System," H. M. Ellis, A. L. Blythe, J. E. Hardy, and J. W. Skooglund, IEEE No. 65–813, October 1965.

(31) "The Automatic Control of Electric Power in the United States," Nathan Cohn, IEEE Spectrum, November 1965.

(32) "Fringe Generation Damps Tie-Line Oscillations," Electrical World, Jan. 10, 1966, p. 48 et seq.

(33) "A Modern View of Out of Step Relaying," G. D. Rockefeller and W. A. Elmore, IEEE No. 66–34, Winter Power Meeting, 1966.

(34) "Five Years' Experience on the Consolidated Edison System With Protection of Turbine Generators and Boilers by Automatic Tripping," W. C. Beattie, H. A. Bauman, J. M. Driscoll, T. J. Onderdonk, R. L. Webb, Trans, AIEE February 1959, vol. 77–III (and discussion), pp. 1353–1366.

(35) "Protection of Large Steam Turbine Generator Units on TVA System," M. S. Merritt, J. A. Ackerman, R. C. Price, and L. E. Owen, IEEE "Power Apparatus and Systems," April 1965.

(36) "The Story of Bonneville Power," Friedlander, Spectrum, December 1968, p. 72.

(37) Letter to the Editor, Peter Kubilius, "Electrical World," Nov. 29, 1965, p. 5.

*(38) Sokolov, N. I. et al. Elektrichestvo 1963, No. 10, pp. 5–13.*

*(39) Kashtelan et al., Elektrichestvo, 1965, No. 4, pp. 1–8.*

*(40) DeMello, F. P., Ewart, D. N., Temoshok, M., and Eggenberger, M. A., "Turbine Energy Controls Aid in Power System Performance," Proc. American Power Conference 1966, vol. 28, pp. 438–445.*

*(41) Park, R. H., "Improved Reliability of Bulk Power Supply by Fast Load Control," Proc. Amer. Power Conf., 30, 1128–1141 (1968).*

*(42) Concordia, C., and Brown, P. G., "Effects of Trends in Large Steam Turbine Driven Generator Parameters on Power System Stability," IEEE paper 71 TP74–PWR, Trans. IEEE Power Apparatus and Systems, pp. 2211–2218.*

*(43) Lokay, H. E. and Thoits, P. O., "Effects of Future Turbine-Generator Characteristics on Transient Stability," IEEE paper 71 TP75–PWR, Trans, IEEE Power Apparatus and systems, PAS 90, pp. 2427–2431 (1971), November–December.*

*(44) Cushing, E. W., Jr., et al., "Fast Valving as an Aid to Power System Transient Stability and Prompt Resynchronization and Rapid Reload After Full Load Rejection," IEEE paper 71 TP705–PWR (see Trans. IEEE Power Apparatus and Systems).*

*(45) Kirkmayer, Leon K., "Economic Control of Interconnected Systems, John Wiley and Sons, 1959.*

*(46) Farmer, R. G., Kent, M. H., Hartley, R. H. and Wheeler, L. M., "Four Corners Project Stability Studies," Paper No. 68 CP 708–PWR, Trans. IEEE Power Apparatus and Systems.*

*(47) Park, R. H., U.S. Pat. No. 3,657,552, "Method of Employment of Fast Turbine Valving," Apr. 18, 1972.*

*(48) Eggenberger, M. A., et al., U.S. Pat. No. 3,198,-954, "Overspeed Anticipation Device," Aug. 3, 1965.*

*(49) Giras, Theodore C. and Hoffman, Arthur G., "High Speed Tie-Line Controller," Proc. Amer. Power Conf., vol. 27, pp. 898–907 (1965).*

*(50) "Electro-Hydraulic Control for Improved Availability and Operation of Large Steam Turbines," M. Birnbaum and E. G. Noyes, IEEE Conference paper 31 CP C5–776.*

*(51) "Safe Cycling of High Pressure Steam Turbines," Werner Trassl, Proceedings of the American Power Conference, vol. 31, 1969, pp. 306–313.*

*(52) "Managing Megawatts, a Case History," Gordon R. Friedlander, IEEE Spectrum, May, 1972, pp. 39–41.*

*(53) Eggenberger, M. A., "Introduction to the Basic Elements of Control Systems for Large Steam Turbine-Generators," IEEE Tutorial Course Text 70 M29–PWR "The Role of Prime Movers in System Stability," pp. 91–141.*

*(54) O. J. Aanstad and H. E. Lokay, "Fast Valve Control Can Imprive Turbine-Generator Response to Transient Disturbances," Westinghouse Engineer, July 1970, pp. 114–118.*

*Whereas in the foregoing citation has been made several references, (namely 3, 4, 12, 14, 16, 18, 27), as describing use of already known types of power responsive or other controls as a way "to program application of braking load, prime mover driving power boosting and braking and load shedding," on a feed forward basis the point applies that other reference could have been cited as of the date of filing of the parent application, namely references 2, 5, 8, 9, 10, 13, 17, 18, 21, 22, 29, 30, 33, 36 of the present and parent application. Also further references that could have been cited comprise notably U.S. Pat. No. 3,198,954 which issued to M. A. Eggenberger et al. on Aug. 3, 1965, (48) and two other 1965 publications (49, 50, the first of which (49) describing a fast acting feed-back type turbine control system that could readily be modified so as to provide still faster open loop feed forward type control action, and the second (50) which also represents item (d) of reference 1 of reference 47 of this application, which describes a Westinghouse electrohlydraulic type control system that is generally similar to the GE Co. system described in references 22 and 53.*

*Still another significant reference that cites fast acting prime mover driving power control means that were commercially available prior to the date of file of the parent of the present application, comprises a 1969 American Power Conference paper by Werner Trassl (51) of Siemens A.G. which states that as early as 1960 there began to develop widespread installation on the continent of Europe of power system, steam electric installations which combined employment of one-through boilers with reheat type steam turbines equipped with electrically controlled means for simultaneously closing control and in-intercepting valves in $^1/_2$ second in response to a feed forward type signal, together with simultaneously initiated opening of steam by-pass valves which become opened in 6 seconds.*

*Also applicant has been advised by engineers of two other European producers of power system steam turbines, namely M.A.N. and Brown Boveri have, since around 1960, supplied power system turbines and controls similar to those supplied by Siemens.*

*Also on review with Westinghouse and Brown Boveri, as of the latter part of 1969, it came out and was subsequently confirmed that in the case of both of these turbine suppliers, well worked out turbine control system designs of that date were such as to make it possible to quote on providing feed type forward signal controlled partial control valve closure executed in a fraction of a second, while Brown Boveri was also prepared to offer feed forward controlled partial intercepting valve closure.*

*While the controls provided by European turbine producers cited just above were of a type that required them to be preset prior to a disturbance, it will be apparent to those skilled in the art that there would be no problem in providing a means for modulating such controls so that the effects produced would become responsive to the magnitude of an electrical signal since this would merely mean providing what GE (22, 53) and Westinghouse (8, 29, 49, 50) either had already done and which would at most require employment of fast acting electrohydraulic servo systems of types such as were widely employed by the military forces of the U.S. and other nations during and following World War II.*

*Thus, as of and before the date of file of the application of the parent patent there were several steam turbine producers that supplied turbine control systems that were already adapted to, or could be easily so modified as, to effect partial as well as full closure of either or both control and intercepting valves in a fraction of a second on a feed forward basis in response to an electrical signal, hence with a speed of response adapted to allow favorably effecting system stability.*

*In addition it would not be difficult to show that it is old in the art of power distribution system switchgear design and control to provide for fast opening of circuit breakers of distribution circuits that control supply of power to the premises of customers, in as little as 2 or 3 cycles, and to reclose if desired in a roughly comparable time period, and it could further be readily shown that it has long been feasible to arrange to operate circuit breakers by remote control from a central point and to transmit load data to control centers from remote points and to alter the setting of local control systems from centrally located control centers.*

*On this score the content of reference (52) well indicates that at the time when the parent application was filed it did not represent a problem that could not be readily dealt with to control load shedding and restoration from centrally located control centers.*

*Therefore it appears evident that the aspect of the means or hardware needed to allow embodiment of the invention of the present application as a new method of power system control was either fully available or at any rate capable of being readily made available when the parent application was filed.*

While the present invention has been described in conjunction with preferred embodiments, it is to be understood that modifications and variations may be resorted to without departing from the spirit and scope of the invention, as those skilled in the art will readily understand.

Thus, for example, persons skilled in the art can readily devise a digital type signal and memory unit for use in place of the analog types illustrated in FIGS. 2 and 5.

Also, an aspect of a digital signal generator would be that values of $P_{sb}$, or in the event of an excess of power supply in system 1, a quantity which could be designated $P_{br}$, where $$P_{br}=L_b+P_r$$

where:

$L_b$=electrical braking load $P_r$=a measure of benefit equivalent to application of braking load that can be derived from reduction of system 1 prime mover driving power plus effects due to fast regulation of power supply over D.C. lines, if any could be arrived at in relation to type of power interruption and transmission system load conditions by reference to suitable digitally stored data which could have been arrived at by suitable advance system studies.

*Again whereas FIG. 1 shows a single circuit breaker at the terminus of each transmission circuit and serially connected in the output circuit of each generator, as will be understood by those skilled in the art, for the most part in present practice transmission circuits terminate at, and also generators connect to, a pair of circuit breakers which make connection to each of a pair of busses, it will be apparent that the teachings of the parent patent and of this disclosure apply, regardless of whether or not bus connections are of the dual type.*

*Yet another point that may warrant note is that whereas in my patents U.S. 3,051,842 and Re 26,571 I refer to "segments of a power system" I have elected to also sometimes employ in the present and its parent application the equivalent expression "area of a power system," based on the fact that the word "area" is more in conformity with usage of power system engineers .*

Modifications and variations such as the foregoing are considered to be within the purview and scope of the invention and the appended claims.

*In the matter of claim terminology the terms "fast prime mover driving power boost" and "fast boost of the driving power of the prime mover of a generator on a feed forward basis" are to be interpreted as comprising any process which causes the driving power of a power system generator prime mover to increase in response to receipt of a feed forward type signal and to do so rapidly enough to prevent or oppose development of system instability in a period immediately following a stability en-*

*dangering event in greater degree than would apply in the event of reliance solely on the operation of a feed back type speed responsive turbine control system.*

*Similarly the terms "fast prime mover driving power reduction" and "effecting fast reduction of the driving power of a prime mover of a generator on a feed forward basis" are to be interpreted as comprising any process which causes the driving power of a power system generator prime mover to decrease in response to receipt of a feed forward type signal and to do so rapidly enough to prevent or oppose development of system instability in a period immediately following a stability endangering event in greater degree than would apply in the event of reliance solely on the operation of a feed back type speed responsive turbine control system.*

*The term "internal path of power flow" is used in the claims in a manner that is intended to be essentially self-explanatory. However to clarify its meaning, in FIG. 1 the radial path of power flow from generator $G_1$ to bus 1 comprises a generator transformer and a circuit breaker, and the same applies to generator $G_2$.*

*Also in the case of generators $G_3$ and $G_4$ there are radial paths of power flow which relate to each generator and consist of the generator transformers and circuit breaker but in addition there is a further radial path of power flow which consists of the totality of transmission circuits 1–1a which tie bus 1–1a to bus 1.*

*If the generator $G_3$ breaker opens as result of some event this will constitute interruption of a radial path of power flow and the effect will be a loss of power input to bus 1 equal to the pre-event power output of that generator.*

*If only one circuit of transmission system 1–1a opens this will not constitute interruption of a radial path of power flow. However if all circuits of transmission system 1–1a open, due to any event, the effect constitutes a sudden interruption of a radial path of power flow, which causes reduction of power supply to bus 1, in the amount of the sum of the pre-event power output of generators $G_3$ and $G_4$.*

*As explained in the summary of the invention a fault on one line or circuit of a transmission system could sometimes have the effect of causing one or more generators to pull out of step with the balance of the power system, in which case all lines or circuits of the transmission system would ordinarily open in response to protective relay system action and this type of thing could operate to cause entire interruption of power flow over transmission system 1–1a which when happening would represent an "interruption of power flow to bus 1 over a radial type internal path of flow."*

*Similar considerations apply to generator $G_5$ and the load connected to bus 1b, in that the generator breaker could open, or a breaker or breakers controlling flow of power out of bus 1b to its load could open, and the effect would be to either interrupt supply to, or acceptance of load by, bus 1b, and would lead to a related change in the new power input to bus 1, but it would also be possible for all lines or circuits of transmission system 1–1b to open, and this would constitute interruption of a radial path of power flow that would reduce the power input to bus 1 by an amount equal to the algebraic value of the difference of the magnitude of the pre-vent generator $G_5$ power output and bus 1b load.*

*In the body of the application reference is made to systems 1, 2, 3, and 4, which are shown diagrammatically in FIG. 1 and which may typically be dynamically relatively independent, or "integral," in that the rotors of the generators of each system can be expected to swing in the event of a fault on either of transmissions 1–2, 1–3, or 1–4.*

*In the claims the word area is to be interpreted as embracing any portion of a system or interconnection of systems which tends to behave in a generally "dynamically independent" or integral manner in the event of a fault on a transmission circuit or some other system stability endangering event.*

*In the claims the words inter-area path of power flow is intended to include one or more circuits which constitute the total of circuits which connect system 1 bus to one or more dynamically integral areas of the total system, and the word inter-area transmission circuit is intended to mean any individual circuit that makes such connection.*

*Also the word system as used in the claims is to be interpreted to include an interconnection of systems.*

*Further, in the claims the phase "responding to the occurrence of at least one type of event coming within a class of events comprising types that are adapted to cause" interruption of supply of power or interruption of power flow or power system instability is intended to mean response to operation of a relay or any other device that responds to an event that merely may sometimes but would not usually bring about interruption or instability, as well as response to a relay or device which would normally but, in the case of some equipment malfunction, might not bring about the effect specified, and where interruption is involved is intended to also include response to devices that respond to the fact that a process of interruption either has been initiated or has in fact taken place, such as circuit breaker auxiliary contacts that are arranged to either close or open in response to breaker operation, and relays or devices that are responsive to interruption of current flow, and where instability is involved, to include response to relays or devices that respond to the fact that development of instability is about to take place or has already taken place.*

*The term "system conditions" is to mean station and line loadings, power output of generators, direction of power flow over lines, and lines and generators out of service.*

*The phrases "only when needed" and "to whatever extent needed" are to be interpreted as representing something that it would be sought to accomplish, if only imperfectly, but that would in any event be so executed as to provide a margin of safety whereby to assure against development of system instability.*

*The phrase "shed load" is intended to include shedding load at one or more points within the area within which prime mover driving power boosting is effected, and the phrase "application of braking load" is intended to include application of braking load at one or more points within the area within which prime mover driving power is effected.*

*Based on the foregoing definitions of claim terminology what* [What] I claim as new and desire to secure by Letters Patent of the United States is:

[1. In a power system having generators and loads disposed upon the premises of a customer and including a combination of interruptible and noninterruptible loads, load shedding apparatus comprising means for reflecting interruption of flow of power from said system to said interruptible loads in response to momentary interruption of power flow from said system to said combination of loads, and means for automatically reconnecting said interruptible loads after a time delay period determined by a timing device.]

2. In an extended power system interconnection incorporating power generating and power receiving elements, a transmission system comprising at least two lines which act in parallel to electrically unite system power generating and power receiving elements one of said lines being a D.C. line, a device for reducing the power flow over said D.C. line in response to the occurrence of certain events, control means for said device adapted for inducing power flow reducing operation of said device, means for activating said control means, fast prime mover driving power and system connected electrical load control means for favorably affecting the stability of the interconnection notwithstanding the reduction of power flow over said D.C. line, and means responsive to the event leading to power flow reduction for initiating action of said fast prime mover driving power and system connected electrical load control means substantially concidentally with the occurrence of said reduction.

*3. In an area of a power system within which power is distributed over power distribution circuits to loads located upon the premises of one or more customers, and wherein at least a portion of the load of at least one customer is equipped with voltage responsive control means of a type adapted to disconnect the said portion of the said load in response to a momentary interruption of power supply to said premises and to automatically reconnect the said portion of said load on restoration of power supply, and wherein it is arranged so that restoration takes place after a preset time delay period determined by a timing device, and wherein, also power flow interruption means are provided which are adapted to momentarily interrupt power flow to said premises of said customer in response to a load shed signal, the method of improving reliability of bulk power supply within the power system which consists in the steps of,*

*(a) providing so that receipt of a load shed signal by said power flow interruption means will cause the said interruption means to momentarily interrupt power flow to said customer's premises for a period long enough to cause disconnection of the said portion of said customers' load,*

*(b) providing so that a load shed signal is automatically transmitted to said power flow interruption means in response to the sudden occurrence of one or more events.*

*4. The method of claim 3 wherein a load shed signal is transmitted to said power flow interruption means in response to the occurrence of at least one even of a type coming within a class of events that are adapted to cause power system instability.*

*5. The method 3 wherein a load shed signal is transmitted to said power flow interruption means in response to the occurrence of at least one event of a type coming within a class of events that are adapted to cause sudden isolation of a source of system power.*

*6. The method of claim 3 wherein the timing devices that control duration of load shedding of those portions of system load that are arranged to be disconnected for preset time periods in response to momentary interruptions of power supply to customer's premises are arranged to be preset in such manner that when power supply is restored following momentary interruption of power supply loads that have been disconnected are reenergized progressively.*

*7. In a power system which includes a plurality of transmission circuits which make connection at each end to one of a plurality of transmission circuit busses through power flow interruption systems comprising power flow interruption means conjoined with power flow interruption control means which are adapted to control operation of said power flow interruption means in response to the occurrence of one or more events, a plurality of prime mover driven generators each of which also makes connection to at least one of the said transmission circuit busses through a power flow interruption system incorporating power flow interruption means also conjoined with power flow interruption control means that respond to one or more events, and wherein each generator is driven by a prime mover which is provided with a prime mover driving power controller, an area of the system which comprises a transmission circuit bus to which loads and two or more generators which are internal to the area make connection over one or more internal paths of power flow which are radial to the said bus in the sense that connection of the said loads and generators to the balance of the said system takes place exclusively over one or more inter-area type transmission circuits which terminate at said bus, the method of design and operation of the power system which seeks to preserve system stability via employment of the steps of*

*(a) equipping the prime mover of at least one generator located within the said area with control means adapted to allow effecting fast boost of the driving power of the prime mover of said generator on a feed forward basis in response to the reception of a fast driving power boost signal,*

*(b) providing so as to cause transmission of a fast driving power boost signal to said control means of said prime mover in response to the occurrence of at least one type of event coming within a class of events comprising types that are adapted to cause interruption of supply of power to said transmission circuit bus by bringing about interruption of power flow over one or more of said radial type internal paths of flow.*

*8. The method of claim 7 supplemented by steps directed to minimize need to effect prime mover driving power boost as follows:*

*(a) providing a signal generator which generates and stores in one or more memory devices, fast prime mover driving power boost signals the magnitude of which depends partly on the nature of any of one or more events that are capable of bringing about initiation of fast boosting of the driving power of the prime mover of the said generator and partly on the magnitude and direction of predisturbance system conditions, and wherein the signal or signals are caused to be of such magnitude as to bring into effect boosting of the driving power of the said prime mover when but only when needed as a way to provide against hazard of development of system instability,*

*(b) providing so that the magnitude of the driving power boost signal that is transmitted to the said control means of the said prime mover conforms to the magnitude of the stored signal that identifies with the prime mover driving power boost signal initiating event.*

*9. The method of claim 7 supplemented by the steps of*

*(a) providing load shedding means to effect shedding of load in response to a load shed signal*

*(b) providing so as to transmit a load shed signal by the said load shedding means coincidentally with transmission of a fast prime mover driving power boost signal to said control means of said prime mover.*

*10. The method of claim 9 supplemented by steps directed to minimizing need to shed load as follows:*

*(a) providing a signal generator which generates and stores in one or more memory devices, load shed signals the magnitude of which depends partly on the nature of any of one or more events that are capable of bringing about initiation of fast boosting of the driving power of the prime mover of the said generator and partly on the magnitude and direction of predisturbance system conditions, and wherein the signal or signals are caused to be of such magnitude as to bring into effect load shedding only to whatever extent needed as a way to provide against hazard of development of system instability.*

*(b) providing so that the magnitude of the load shed signal that is transmitted to the said load shedding means conforms to the magnitude of the stored signal that identifies with the prime mover driving power boost signal initiating event.*

*11. In a power system which includes a plurality of transmission circuits which make connection at each end to one of a plurality of transmission circuit busses through power flow interruption systems comprising power flow interruption means conjoined with power flow interruption control means which are adapted to control operation of said power flow interruption means in response to*

*the occurrence of one or more events, a plurality of prime mover driven generators each of which also makes connection to at least one of the said transmission circuit busses through a power flow interruption system incorporating power flow interruption means also conjoined with power flow interruption control means that respond to one or more events, and wherein each generator is driven by a prime mover which is provided with a prime mover driving power controller, an area of the system which comprises a transmission circuit bus to which loads and two or more generators which are internal to the area make connection over one or more internal paths of power Yow which are radial to the said bus in the sense that connection of the said loads and generators to the balance of the said system takes place exclusively over one or more inter-area type transmission circuits which terminate at said bus, the method of design and operation of the power system which seeks to preserve system stability via employment of the steps of*

*(a) equipping the primer mover of at least one generator located within the said area with control means adapted to allow effecting fast boost of the driving power of the prime mover of said generator on a feed forward basis in response to the reception of a fast driving power boost signal,*

*(b) providing so as to cause transmission of a fast driving power boost signal to said control means of said prime mover in response to the occurrence of at least one type of event coming within a class of events comprising types that are adapted to cause interruption of power flow to said transmission circuit bus over an interarea path of power flow which incorporates at least a pair of interarea transmission circuits.*

*12. The method of claim 11 supplemented by steps directed to minimize need to effect prime mover driving power boost as follows:*

*(a) providing a signal generator which generates and stores in one or more memory devices, fast prime mover driving power boost signals the magnitude of which depends partly on the nature of any of one or more events that are capable of bringing about initiation of fast boosting of the driving power of the prime mover of the said generator and partly on the magnitude and direction of predisturbance system conditions, and wherein the signal or signals are caused to be of such magnitude as to bring into effect boosting of the driving power of the said prime mover when but only when needed as a way to provide against hazard of development of system instability,*

*(b) providing so that the magnitude of the driving power boost signal that is transmitted to the said control means of the said prime mover conforms to the magnitude of the stored signal that identifies with the prime mover driving power boost signal initiating event.*

*13. The method of claim 11 supplemented by the steps of*

*(a) providing load shedding means to effect shedding of load in response to a load shed signal*

*(b) providing so as to transmit a load shed signal by the said load shedding means coincidentally with transmission of a fast prime mover driving power boost signal to said control means of said prime mover.*

*14. The method of claim 11 supplemented by steps directed to minimizing need to shed load as follows:*

*(a) providing a signal generator which generates and stores in one or more memory devices, load shed signals the magnitude of which depends partly on the nature of any of one or more events that are capable of bringing about initiation of fast boosting of the driving power of the prime mover of the said generator and partly on the magnitude and direction of predisturbance system conditions, and wherein the signal or signals are caused to be of such magnitude as to bring into effect load shedding only to whatever extent needed as a way to provide against hazard of development of system instability,*

*(b) providing so that the magnitude of the load shed signal that is transmitted to the said load shedding means conforms to the magnitude of the stored signal that identifies with the prime mover driving power boost signal initiating event.*

*15. In a power system which includes a plurality of transmission circuits which make connection at each end to one of a plurality of transmission circuit busses through power flow interruption systems comprising power flow interruption means conjoined with power flow interruption control means which are adapted to control operation of said power flow interruption means in response to the occurrence of one or more events, a plurality of prime mover driven generators each of which also makes connection to at least one of the said transmission circuit busses through a power flow interruption system incorporating power flow interruption means also conjoined with power flow interruption control means that respond to one or more events, and wherein each generator is driven by a prime mover which is provided with a prime mover driving power controller, and area of the system which comprises a transmission circuit bus to which one or more generators make connection over one or more paths of power flow which are radial to the said bus in the sense that connection of the said loads and generators to the balance of the said system takes place exclusively over two or more inter-area type paths of power flow which terminate at said bus and which include a total of at least three inter-area transmission circuits, the method of design and operation of the power system which seeks to preserve system stability via employment of the steps of*

*(a) equipping at least one generator located within the said area with control means adapted to allow effecting a fast reduction of the driving power of the prime mover of said generator on a feed forward basis in response to the generation of a fast driving power reduction signal,*

*(b) providing so as to cause transmission of a fast driving power reduction signal to said control means of said prime mover in response to the occurrence of at least one type of event coming within a class of events comprising types that are adapted to cause interruption of supply of power to said transmission circuit bus by bringing about interruption of power flow over one or more of said radial type internal paths of flow.*

*16. The method of claim 15 supplemented by steps directed to minimize need to effect prime mover driving power reduction as follows:*

*(a) providing a signal generator which generates and stores in one or more memory devices, fast prime mover driving power reduction signals the magnitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect reduction of the driving power of the said prime mover when but only when needed as a way to provide against hazard of development of system instability*

*(b) providing so that the magnitude of the driving power reduction signal that is transmited to the said control means of the said prime mover conforms to the magnitude of the stored signal that identifies with*

*the prime mover driving power reduction signal initiating event.*

*17. The method of claim 15 supplemented by the steps of*

*(a) providing means for momentary application of braking load in response to a braking load application signal*

*(b) providing so as to transmit a braking load application signal to the said means for momentary application of braking load coincidentally with transmission of a fast prime mover driving power reduction signal to said control means of said prime mover.*

*18. The method of claim 15 supplemented by steps directed to minimize need to effect prime mover driving power reduction as follows:*

*(a) providing a signal generator which generates and stores in one or more memory devices, fast prime mover driving power reduction signals the magnitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect reduction of the driving power of the said prime mover only to whatever extent needed as a way to provide against hazard of development of system instability,*

*(b) providing so that the magnitude of the driving power reduction signal that is transmitted to the said control means of the said prime mover conforms to the magnitude of the stored signal that identifies with the prime mover driving power reduction signal initiating event.*

*19. The method of claim 15 supplemented by steps directed to minimizing need to apply braking load as follows:*

*(a) providing a signal generator which generates and stores in one or more memory devices braking load application signals the mangitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect application of braking load only to whatever extent needed as a way to provide against hazard of development of system instability,*

*(b) providing so that the magnitude of the braking load application signal that is transmitted to the said load shedding means conforms to the magnitude of the stored signal that identifies with the prime mover driving power reduction signal initiating event.*

*20. In a power system which includes a plurality of transmission circuits which make connection at each end to one of a plurality of transmission circuit busses through power flow interruption systems comprising power flow interruption means conjoined with power flow interruption means which are adapted to control operation of said power flow interruption means in response to the occurrence of one or more events, a plurality of prime mover driven generators each of which also makes connection to at least one of the said transmission circuit busses through a power flow interruption system incorporating power flow interruption means also conjoined with power flow interruption control means that respond to one or more events, and wherein each generator is driven by a prime mover which is provided with a prime mover driving power controller, an area of the system which comprises a transmission circuit bus to which one or more generators make connection over one or more paths of power flow which are radial to the said bus in the sense that connection of the said loads and generators to the balance of the said system takes palce exclusively over two or more inter-area type paths of power flow which terminat at said bus and which include a total of at least three inter-area transmission circuits, the method of design and operation of the power system which seeks to preserve system stability via employment of the steps of*

*(a) equipping at least one generator located within the said area with control means adapted to allow effecting a fast reduction of the driving power of the prime mover of said generator on a feed forward basis in response to the generation of a fast driving power reduction signal,*

*(b) providing so as to cause transmission of a fast driving power reduction signal to said control means of said prime mover in response to the occurrence of at least one type of event coming within a class of events comprising types that are adapted to cause interruption of power flow away from transmission circuit bus over an inter-area path of power flow which incorporates at least a pair of inter-area transmission circuits.*

*21. The method of claim 20 supplemented by steps directed to minimize need to effect prime mover driving power reduction as follows:*

*(a) providing a signal generator which generates and stores in one or more memory devices, fast prime mover driving power reduction signals the magnitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect reduction of the driving power of the said prime mover when but only when needed as a way to provide against hazard of development of system instability,*

*(b) providing so that the magnitude of the driving power reduction signal that is transmitted to the said control means of the said prime mover conforms to the magnitude of the stored signal that identifies with the prime mover driving power reduction signal initiating event.*

*22. The method of claim 20 supplemented by the steps of*

*(a) providing means for momentary application of braking load in response to a braking load application signal,*

*(b) providing so as to transmit a braking load application signal to the said means for momentary application of braking load coincidentally with transmission of a fast prime mover driving power reduction signal to said control means of said prime mover.*

*23. The method of claim 20 supplemented by steps directed to minimize need to effect prime mover driving power reduction as follows:*

*(a) providing a signal generator which generates and stores in one or more memory devices, fast prime mover driving power reduction signals the magnitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect reduction of the driving power of the said prime mover only to whatever extent needed as a way to provide against hazard of development of system instability.*

(*b*) *providing so that the magnitude of the driving power reduction signal that is transmitted to the said control means of the said prime mover conforms to the magnitude of the stored signal that identifies with the prime mover driving power reduction signal initiating event.*

*24. The method of claim 20 supplemented by steps directed to minimizing need to apply braking load as follows:*

(*a*) *providing a signal generator which generates and stores in one or more memory devices braking load application signals the magnitude of which depends partly on the nature of any of one or more events that are capable of bringing about initiation of fast reduction of the driving power of the prime mover of the said generator and partly on the magnitude and direction of predisturbance system conditions, and wherein the signal or signals are caused to be of such magnitude as to bring into effect application of braking load only to whatever extent needed as a way to provide against hazard of development of system instability,*

(*b*) *providing so that the magnitude of the braking load application signal that is transmitted to the said load shedding means conforms to the magnitude of the stored signal that identifies with the prime mover driving power reduction signal initiating event.*

References Cited

The following references, cited by the Examiner, are of record in the patented file of this patent or the original patent.

UNITED STATES PATENTS

| | | | |
|---|---|---|---|
| 1,705,688 | 5/1929 | Staege | 307—52 UX |
| 1,935,292 | 11/1933 | Griscom et al. | 307—52 UX |
| 3,271,580 | 9/1966 | Pope | 307—29 |
| 3,300,648 | 1/1967 | Rockeffella et al. | 307—86 X |
| 3,124,699 | 3/1964 | Kirchmayer | 307—57 |
| 3,229,110 | 1/1966 | Kleinback et al. | 307—29 |

HERMAN J. HOHAUSER, Primary Examiner

U.S. Cl. X.R.

307—19, 29, 85, 102, 153; 235—151.21